(12) United States Patent
Yoo et al.

(10) Patent No.: US 10,531,084 B2
(45) Date of Patent: Jan. 7, 2020

(54) INTRA PREDICTION MODE BASED IMAGE PROCESSING METHOD, AND APPARATUS THEREFOR

(71) Applicant: LG ELECTRONICS INC., Seoul (KR)

(72) Inventors: Sunmi Yoo, Seoul (KR); Jin Heo, Seoul (KR); Yongjoon Jeon, Seoul (KR); Eunyong Son, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/736,415

(22) PCT Filed: Jun. 14, 2016

(86) PCT No.: PCT/KR2016/006286
§ 371 (c)(1),
(2) Date: Dec. 14, 2017

(87) PCT Pub. No.: WO2016/204478
PCT Pub. Date: Dec. 22, 2016

(65) Prior Publication Data
US 2018/0184082 A1  Jun. 28, 2018

Related U.S. Application Data

(60) Provisional application No. 62/215,035, filed on Sep. 6, 2015, provisional application No. 62/175,434, filed on Jun. 15, 2015.

(51) Int. Cl.
*H04N 11/02* (2006.01)
*H04N 19/105* (2014.01)
(Continued)

(52) U.S. Cl.
CPC ......... *H04N 19/105* (2014.11); *H04N 19/107* (2014.11); *H04N 19/11* (2014.11);
(Continued)

(58) Field of Classification Search
CPC .... H04N 19/105; H04N 19/107; H04N 19/11; H04N 19/159; H04N 19/176; H04N 19/593
(Continued)

(56) References Cited

U.S. PATENT DOCUMENTS

| | | | |
|---|---|---|---|
| 2013/0022108 A1* | 1/2013 | Panusopone | H04N 19/159 375/240.03 |
| 2013/0266064 A1* | 10/2013 | Zhang | H04N 19/50 375/240.12 |
| 2014/0334543 A1* | 11/2014 | Lee | H04N 19/70 375/240.12 |

FOREIGN PATENT DOCUMENTS

| | | |
|---|---|---|
| KR | 10-2013-0034559 A | 4/2013 |
| KR | 10-2013-0058524 A | 6/2013 |

(Continued)

*Primary Examiner* — Jayanti K Patel
*Assistant Examiner* — Richard B Carter
(74) *Attorney, Agent, or Firm* — Birch, Stewart, Kolasch & Birch, LLP

(57) ABSTRACT

Disclosed are an intra prediction mode based image processing method, and an apparatus therefor. In particular, a method for processing an image on the basis of an intra prediction mode comprises the steps of: inputting, in most probable mode (MPM) candidates, intra prediction modes of a plurality of neighboring blocks which neighbor a current block, and then deriving the MPM candidates by inputting, in the MPM candidates, intra prediction modes within substitute modes consisting of a plurality of intra prediction modes, to which priorities are given, according to the priorities until the total number of MPM candidates is satisfied; deriving, from the MPM candidates, an intra (Continued)

prediction mode applied to the current block using an MPM index indicating a specific intra prediction mode; and generating a prediction block of the current block by applying the derived intra prediction mode.

8 Claims, 23 Drawing Sheets

(51) Int. Cl.
*H04N 19/176* (2014.01)
*H04N 19/107* (2014.01)
*H04N 19/159* (2014.01)
*H04N 19/593* (2014.01)
*H04N 19/11* (2014.01)

(52) U.S. Cl.
CPC ......... *H04N 19/159* (2014.11); *H04N 19/176* (2014.11); *H04N 19/593* (2014.11)

(58) Field of Classification Search
USPC .................................................. 375/240.02
See application file for complete search history.

(56) References Cited

FOREIGN PATENT DOCUMENTS

| | | |
|---|---|---|
| KR | 10-2013-0088079 A | 8/2013 |
| WO | WO 2013/062192 A1 | 5/2013 |

\* cited by examiner

Depth = 0

Depth = 1

Depth = 2

Depth = 3

(a)     (b)

Intra:

2Nx2N

NxN

Inter:

2Nx2N

NxN

2NxN

Nx2N nLx2N nRx2N

2NxnU

2NxnD

0:Planar
1:DC
2:Horizontal Planar
3:Vertical Planar (a)

(b)

Intra-decoding unit

INTRA PREDICTION MODE BASED IMAGE PROCESSING METHOD, AND APPARATUS THEREFOR

CROSS REFERENCE TO RELATED APPLICATIONS

This application is the National Phase of PCT International Application No. PCT/KR2016/006286, filed on Jun. 14, 2016, which claims priority under 35 U.S.C. 119(e) to U.S. Provisional Application No. 62/175,434, filed on Jun. 15, 2015, and U.S. Provisional Application No. 62/215,035, filed on Sep. 6, 2015, all of which are hereby expressly incorporated by reference into the present application.

TECHNICAL FIELD

The present invention relates to a still image or moving image processing method and, more particularly, to a method of encoding/decoding a still image or moving image based on an intra-prediction mode and an apparatus supporting the same.

BACKGROUND ART

Compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

Next generation video content is supposed to have the characteristics of high spatial resolution, a high frame rate and high dimensionality of scene representation. In order to process such content, a drastic increase of memory storage, a memory access rate and processing power will result.

Accordingly, it is required to design a coding tool for efficiently processing a next generation video content.

DISCLOSURE

Technical Problem

In the existing technology for compressing a still image or moving image, a method of compressing an image based on a block is used. In particular, when a planar mode of intra-prediction modes is applied, there is a problem in that prediction accuracy is low if top (or left) reference samples have similar sample values or a sample value between a top reference sample and a left reference sample is great.

In order to solve the problem, an object of the present invention is to propose a new planar prediction method of generating a prediction sample using different reference samples depending on a planar mode (or type).

Furthermore, an object of the present invention is to propose a method of encoding/decoding the type of new planar mode (or new planar mode).

Furthermore, an object of the present invention is to propose a method of encoding/decoding the type of a new planar mode (or new planar mode).

Technical objects to be achieved by the present invention are not limited to the aforementioned objects, and a person having ordinary skill in the art to which the present invention pertains may evidently understand other technological objects from the following description.

Technical Solution

In one aspect of the present invention, a method of processing a video based on an intra-prediction mode may include the steps of deriving a most probable mode (MPM) candidate by inputting intra-prediction modes of a plurality of neighboring blocks neighboring a current block to the MPM candidate and then inputting an intra-prediction mode within a substitute mode configured as a plurality of intra-prediction modes to which priority has been assigned to the MPM candidate based on the priority until a total number of the MPM candidates are satisfied, deriving an intra-prediction mode applied to the current block using an MPM index indicative of a specific intra-prediction mode within the MPM candidate, and generating a prediction block of the current block by applying the derived intra-prediction mode.

In one aspect of the present invention, an apparatus for processing a video based on an intra-prediction mode, may include an MPM candidate derivation unit deriving a most probable mode (MPM) candidate by inputting intra-prediction modes of a plurality of neighboring blocks neighboring a current block to the MPM candidate and then inputting an intra-prediction mode within a substitute mode including a plurality of intra-prediction modes to which priority has been assigned to the MPM candidate based on the priority until a total number of the MPM candidates are satisfied, an intra-prediction mode derivation unit deriving an intra-prediction mode applied to the current block using an MPM index indicative of a specific intra-prediction mode within the MPM candidate, and a prediction block generation unit generating a prediction block of the current block by applying the derived intra-prediction mode.

Preferably, the intra-prediction modes of the neighboring blocks may be input to the MPM candidate according to a predetermined sequence and may not be redundantly input to the MPM candidate.

Preferably, if the intra-prediction mode of the neighboring block is a directional mode, after the intra-prediction mode of the neighboring block is input to the MPM candidate, an intra-prediction mode neighboring the intra-prediction mode of the neighboring block may be input to the MPM candidate.

Preferably, after the intra-prediction mode neighboring the intra-prediction mode of the neighboring block is input to the MPM candidate, an intra-prediction block neighboring the neighboring intra-prediction mode may be input to the MPM candidate.

Preferably, an intra-prediction mode identical with the intra-prediction mode of the neighboring block from among the intra-prediction mode within the substitute mode may not be redundantly input to the MPM candidate.

Preferably, the neighboring block may be selected from a neighboring block candidate group configured as the plurality of blocks neighboring the current block.

Preferably, the neighboring block candidate group may configured as blocks neighboring the current block.

Preferably, the neighboring block candidate group may configured as a block neighboring the current block and blocks neighboring the block neighboring the current block.

Preferably, the neighboring block may be selected by taking into consideration whether an intra-prediction mode of a block belonging to the neighboring block candidate group is capable of being derived and whether a block to which an identical intra-prediction mode is applied exists among the blocks belonging to the neighboring block candidate group.

Preferably, if three neighboring blocks are used to configure the MPM candidate, any one of a block neighboring a left of the current block, a block neighboring a top of the current block, a block neighboring a top left of the current block, a block neighboring a top right of the current block and a block neighboring a left bottom of the current block may be used.

Advantageous Effects

In accordance with the embodiments of the present invention, the characteristics (in particular, a correlation between reference samples, etc.) of an image can be incorporated by selecting a reference sample used for prediction depending on a planar mode (or type).

Furthermore, in accordance with the embodiments of the present invention, prediction performance can be improved by selecting a reference sample used for prediction depending on a planar mode (or type).

Furthermore, in accordance with the embodiments of the present invention, after most probable modes (MPMs) are generated using the statistical characteristics of a prediction mode, the intra-prediction mode of a current block is encoded/decoded using the MPMs. Accordingly, encoding efficiency can be enhanced because the amount of bits necessary to encode the intra-prediction mode of the current block can be reduced.

Furthermore, in accordance with the embodiments of the present invention, encoding efficiency can be improved by reducing the amount of residual signals generated when a still image or moving image is encoded.

The technical effects of the present invention are not limited to the technical effects described above, and other technical effects not mentioned herein may be understood by those skilled in the art from the description below.

DESCRIPTION OF DRAWINGS

The accompanying drawings, which are included herein as a part of the description for helping understanding of the present invention, provide embodiments of the present invention and describe the technical features of the present invention with the description below.

MODE FOR INVENTION

Figure 1:
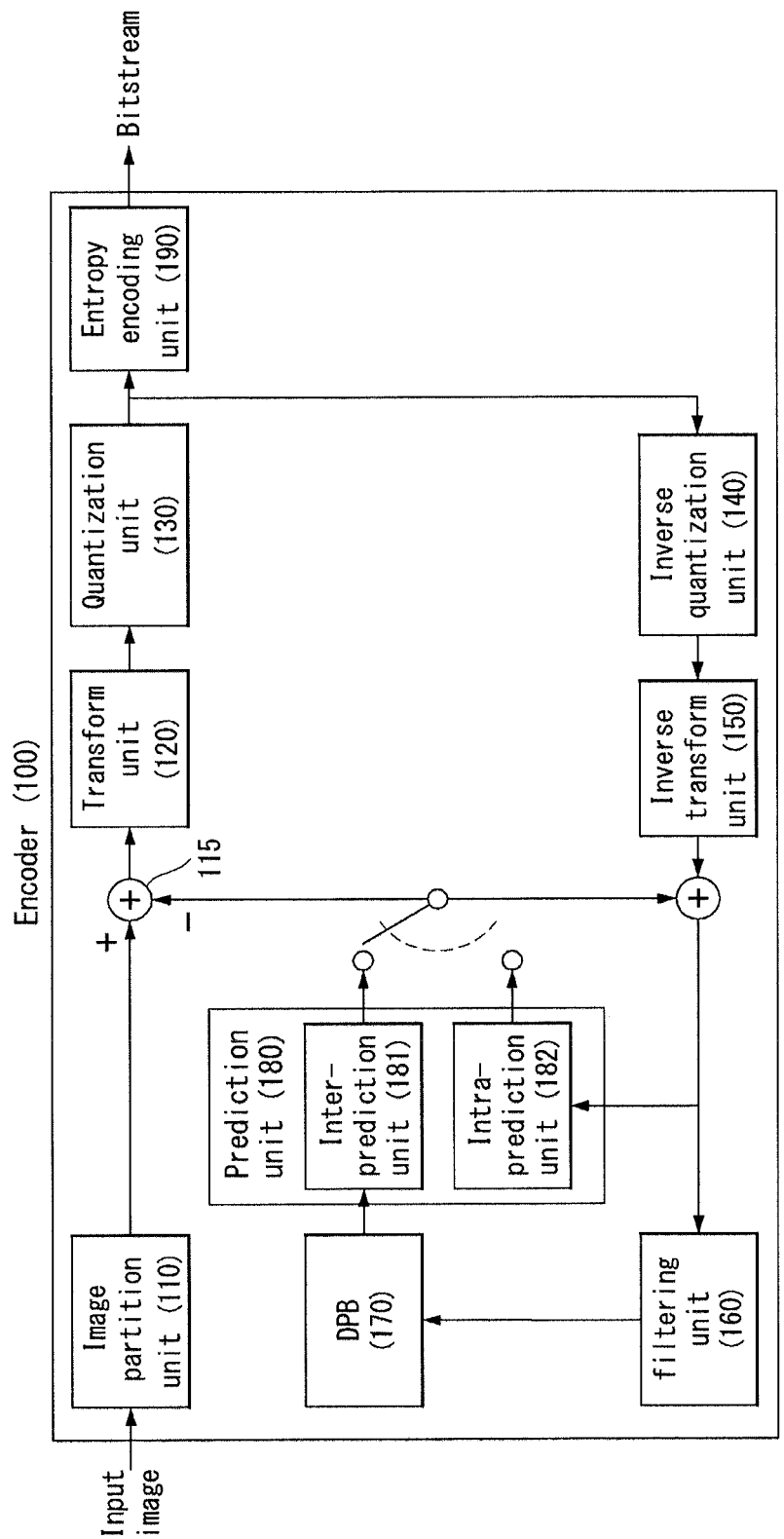
FIG. 1 is an embodiment to which the present invention is applied, and shows a schematic block diagram of an encoder in which the encoding of a still image or moving image signal is performed.

Hereinafter, preferred embodiments of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Hereinafter, in this specification, a "processing unit" means a unit by which an encoding/decoding processing process, such as prediction, transform and/or quantization, is performed. Hereinafter, for convenience of description, a processing unit may also be called a "processing block" or "block."

A processing unit may be construed as a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as a unit for a luma component or a unit for a chroma component. For example, a processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present invention is not limited thereto, and a processing unit may be construed as a meaning including a unit for a luma component and a unit for a chroma component.

Furthermore, a processing unit is not essentially limited to a block of a square, but may have a polygon form having three or more vertexes.

Furthermore, hereinafter, in this specification, a pixel or pixel element is collected referred to as a sample. Furthermore, using a sample may mean using a pixel value or a pixel element value.

FIG. 1 is an embodiment to which the present invention is applied, and shows a schematic block diagram of an encoder in which the encoding of a still image or moving image signal is performed.

Referring to FIG. 1, an encoder 100 may include a picture split unit 110, a subtraction unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., inter-prediction unit 181 or intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate the transform coefficients by performing transform using a determined transform scheme depending on a prediction mode applied to the residual block and the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

Meanwhile, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy. In this case, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels as a prediction block.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. Furthermore, the intra-prediction unit 182 may generate a prediction signal by using the reference sample prepared. Also, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

Figure 2:
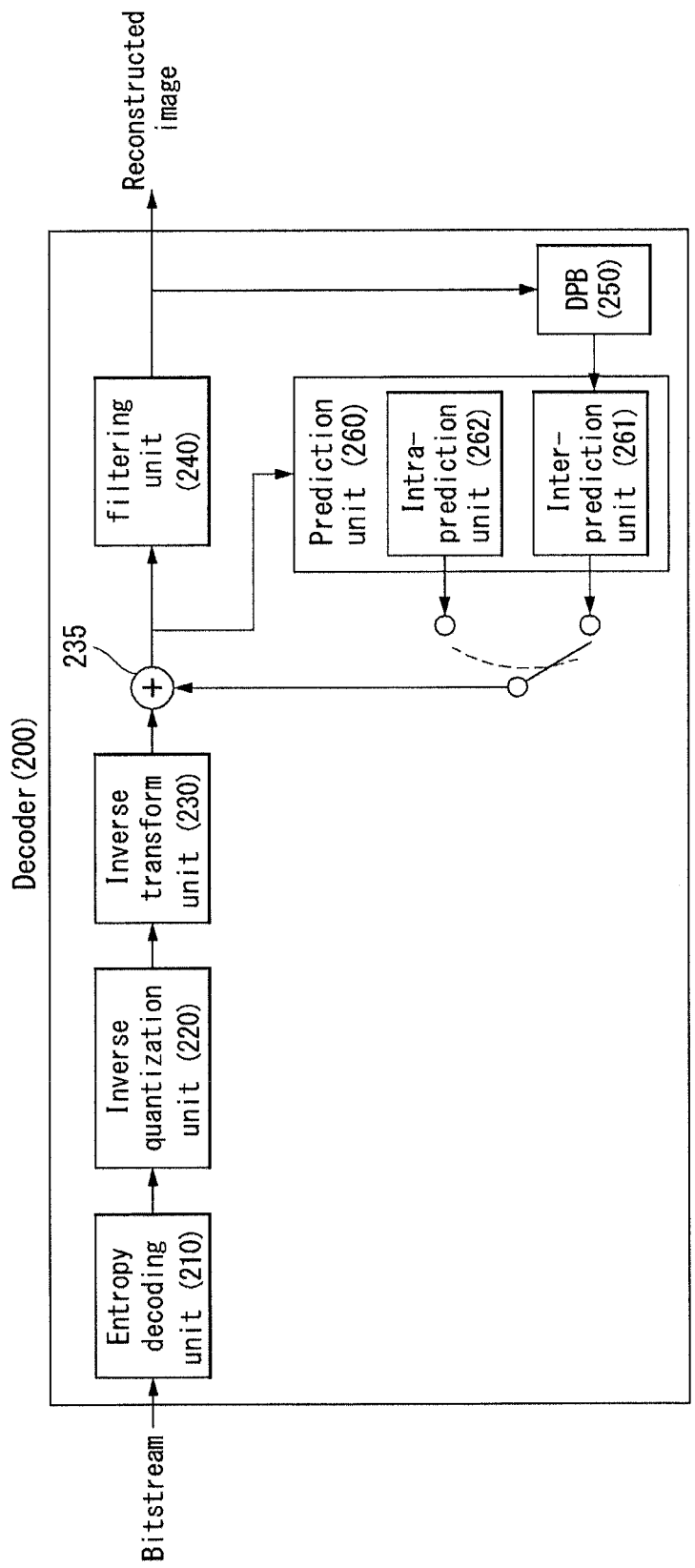
FIG. 2 is an embodiment to which the present invention is applied, and shows a schematic block diagram of a decoder in which the encoding of a still image or moving image signal is performed.

FIG. 2 is an embodiment to which the present invention is applied, and shows a schematic block diagram of a decoder in which the encoding of a still image or moving image signal is performed.

Referring to FIG. 2, a decoder 200 may include an entropy decoding unit 210, a dequantization unit 220, an inverse transform unit 230, an addition unit 235, a filtering unit 240, a decoded picture buffer (DPB) 250 and a prediction unit 260. Furthermore, the prediction unit 260 may include an inter-prediction unit 261 and an intra-prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 22Q acquires a transform coefficient from the entropy-decoded signal using quantization step size information.

The inverse transform unit 230 obtains a residual signal (or residual block) by inversely transforming transform coefficients using an inverse transform scheme.

The adder 235 adds the obtained residual signal (or residual block) to the prediction signal (or prediction block) output by the prediction unit 260 (i.e., inter-prediction unit 261 or intra-prediction unit 262), thereby generating a reconstructed signal (or reconstructed block).

The filtering unit 240 applies filtering to the reconstructed signal (or reconstructed block) and outputs it to a playback device or transmits it to the decoding picture buffer unit 250. The filtered signal transmitted to the decoding picture buffer unit 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

In general, the block-based image compression method is used in a technique (e.g., HEVC) for compressing a still image or a moving image. A block-based image compression method is a method of processing a video by splitting the video into specific block units, and may decrease the capacity of memory and a computational load.

Figure 3:
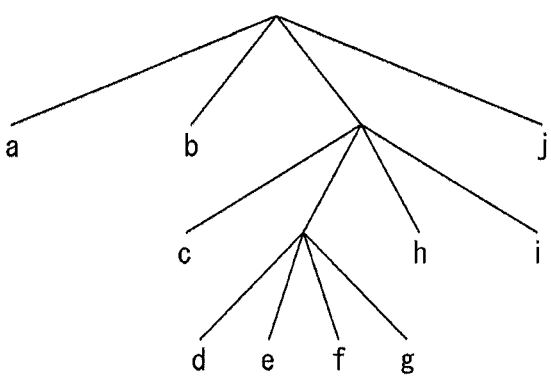
FIG. 3 is a diagram for illustrating the split structure of a coding unit to which the present invention may be applied.
Figure 3:
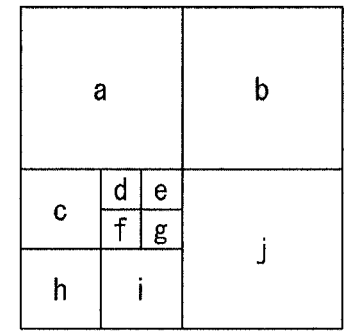

FIG. 3 is a diagram for illustrating the split structure of a coding unit that may be applied to the present invention.

The encoder splits a single image (or picture) in a coding tree unit (CTU) of a rectangle form, and sequentially encodes a CTU one by one according to raster scan order.

In HEVC, the size of a CTU may be determined to be one of 64×64, 32×32 and 16×16. The encoder may select and use the size of CTU according to the resolution of an input video or the characteristics of an input video. A CTU includes a coding tree block (CTB) for a luma component and a CTB for two chroma components corresponding to the luma component.

One CTU may be split in a quad-tree structure. That is, one CTU may be split into four units, each having a half horizontal size and half vertical size while having a square form, thereby being capable of generating a coding unit (CU). The split of the quad-tree structure may be recursively performed. That is, a CU is hierarchically from one CTU in a quad-tree structure.

A CU means a basic unit for a processing process of an input video, for example, coding in which intra/inter prediction is performed. A CU includes a coding block (CB) for a luma component and a CB for two chroma components corresponding to the luma component. In HEVC, the size of a CU may be determined to be one of 64×64, 32×32, 16×16 and 8×8.

Referring to FIG. 3, a root node of a quad-tree is related to a CTU. The quad-tree is split until a leaf node is reached, and the leaf node corresponds to a CU.

This is described in more detail. A CTU corresponds to a root node and has the deepest depth (i.e., depth=0) value. A CTU may not be split depending on the characteristics of an input video. In this case, the CTU corresponds to a CU.

A CTU may be split in a quad-tree form. As a result, lower nodes of a depth 1 (depth=1) are generated. Furthermore, a node (i.e., a leaf node) no longer split from the lower node having the depth of 1 corresponds to a CU. For example, in FIG. 3(*b*), a CU(a), CU(b) and CU(j) corresponding to nodes a, b and j have been once split from a CTU, and have a depth of 1.

At least one of the nodes having the depth of 1 may be split in a quad-tree form again. As a result, lower nodes of a depth 2 (i.e., depth=2) are generated. Furthermore, a node (i.e., leaf node) no longer split from the lower node having the depth of 2 corresponds to a CU. For example, in FIG. 3(*b*), a CU(c), CU(h) and CU(i) corresponding to nodes c, h and i have been twice split from the CTU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from the lower node having the depth of 3 corresponds to a CU. For example, in FIG. 3(*b*), a CU(d), CU(e), CU(f) and CU(g)

corresponding to nodes d, e, f and g have been split from the CTU three times, and have a depth of 3.

In the encoder, a maximum size or minimum size of a CU may be determined according to the characteristics of a video image (e.g., resolution) or by considering encoding rate. Furthermore, information about the size or information capable of deriving the size may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents the split count and/or degree of a CU, the depth information may include information about the size of a CU.

Since the LCU is split in a quad-tree form, the size of the SCU may be obtained using the size of the LCU and maximum depth information. Alternatively, the size of the LCU may be obtained using the size of the SCU and maximum depth information of a tree.

For a single CU, information (e.g., a split CU flag (split_cu_flag)) indicating whether the corresponding CU is split may be forwarded to the decoder. The split information is included in all of CUs except the SCU. For example, when the value of the flag indicating whether to split is '1', the corresponding CU is further split into four CUs, and when the value of the flag that represents whether to split is '0', the corresponding CU is not split any more, and the processing process for the corresponding CU may be performed.

As described above, the CU is a basic unit of the coding in which the intra-prediction or the inter-prediction is performed. The HEVC splits the CU in a prediction unit (PU) for coding an input video more effectively.

The PU is a basic unit for generating a prediction block, and even in a single CU, the prediction block may be generated in different way by a unit of a PU. However, the intra-prediction and the inter-prediction are not used together for the PUs that belong to a single CU, and the PUs that belong to a single CU are coded by the same prediction method (i.e., intra-prediction or the inter-prediction).

The PU is not split in the Quad-tree structure, but is split once in a single CU in a predetermined form. This will be described by reference to the drawing below.

Figure 4:
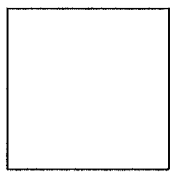
FIG. 4 is a diagram for illustrating a prediction unit to which the present invention may be applied.
Figure 4:
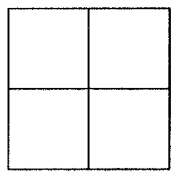
Figure 4:
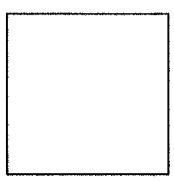
Figure 4:
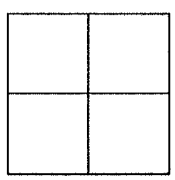
Figure 4:
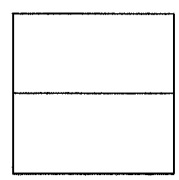
Figure 4:
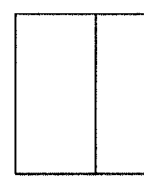
Figure 4:
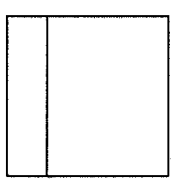
Figure 4:
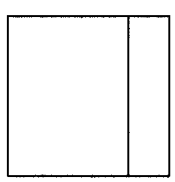
Figure 4:
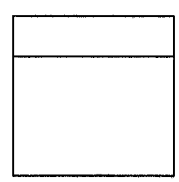
Figure 4:
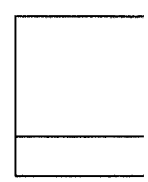

FIG. 4 is a diagram for illustrating a prediction unit that may be applied to the present invention.

A PU is differently split depending on whether the intra-prediction mode is used or the inter-prediction mode is used as the coding mode of the CU to which the PU belongs.

FIG. 4(a) illustrates a PU of the case where the intra-prediction mode is used, and FIG. 4(b) illustrates a PU of the case where the inter-prediction mode is used.

Referring to FIG. 4(a), assuming the case where the size of a single CU is 2N×2N (N=4, 8, 16 and 32), a single CU may be split into two types (i.e., 2N×2N or N×N).

In this case, in the case where a single CU is split into the PU of 2N×2N form, it means that only one PU is existed in a single CU.

In contrast, in the case where a single CU is split into the PU of N×N form, a single CU is split into four PUs, and different prediction blocks are generated for each PU unit. However, such a PU split may be performed only in the case where the size of a CB for the luma component of a CU is a minimum size (i.e., if a CU is the SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in intra-prediction, the PU split of N×N form may be performed only in the case where the size of a CB for the luma component of a CU is a minimum size (i.e., if a CU is the SCU).

Inter-prediction supports the PU split of a 2N×N form in the horizontal direction and an N×2N form in the vertical direction.

In addition, the inter-prediction supports the PU split in the form of nL×2N, nR×2N, 2N×nU and 2N×nD, which is asymmetric motion split (AMP). In this case, 'n' means ¼ value of 2N. However, the AMP may not be used in the case where a CU to which a PU belongs is a CU of minimum size.

In order to efficiently encode an input video in a single CTU, the optimal split structure of a coding unit (CU), prediction unit (PU) and transform unit (TU) may be determined based on a minimum rate-distortion value through the processing process as follows. For example, as for the optimal CU split process in a 64×64 CTU, the rate-distortion cost may be calculated through the split process from a CU of a 64×64 size to a CU of an 8×8 size. A detailed process is as follows.

1) The optimal split structure of a PU and TU that generates a minimum rate distortion value is determined by performing inter/intra-prediction, transformation/quantization, dequantization/inverse transformation and entropy encoding on a CU of a 64×64 size.

2) The optimal split structure of a PU and TU is determined by splitting a 64×64 CU into four CUs of a 32×32 size and generating a minimum rate distortion value for each 32×32 CU.

3) The optimal split structure of a PU and TU is determined by further splitting a 32×32 CU into four CUs of a 16×16 size and generating a minimum rate distortion value for each 16×16 CU.

4) The optimal split structure of a PU and TU is determined by further splitting a 16×16 CU into four CUs of an 8×8 size and generating a minimum rate distortion value for each 8×8 CU.

5) The optimal split structure of a CU in a 16×16 block is determined by comparing the rate-distortion value of the 16×16 CU obtained in the process of 3) with the addition of the rate-distortion value of the four 8×8 CUs obtained in the process of 4). This process is also performed on the remaining three 16×16 CUs in the same manner.

6) The optimal split structure of a CU in a 32×32 block is determined by comparing the rate-distortion value of the 32×32 CU obtained in the process of 2) with the addition of the rate-distortion value of the four 16×16 CUs obtained in the process of 5). This process is also performed on the remaining three 32×32 CUs in the same manner.

7) Lastly, the optimal split structure of a CU in a 64×64 block is determined by comparing the rate-distortion value of the 64×64 CU obtained in the process of 1) with the addition of the rate-distortion value of the four 32×32 CUs obtained in the process of 6).

In an intra-prediction mode, a prediction mode is selected in a PU unit, and prediction and reconstruction are performed on the selected prediction mode in an actual TU unit.

A TU means a basic unit by which actual prediction and reconstruction are performed. A TU includes a transform block (TB) for a luma component and two chroma components corresponding to the luma component.

In the example of FIG. 3, as if one CTU is split in a quad-tree structure to generate a CU, a TU is hierarchically split from one CU to be coded in a quad-tree structure.

A TU is split in the quad-tree structure, and a TU split from a CU may be split into smaller lower TUs. In HEVC, the size of a TU may be determined to be any one of 32×32, 16×16, 8×8 and 4×4.

Referring back to FIG. 3, it is assumed that the root node of the quad-tree is related to a CU. The quad-tree is split until a leaf node is reached, and the leaf node corresponds to a TU.

This is described in more detail. A CU corresponds to a root node and has the deepest depth (i.e., depth=0) value. A CU may not be split depending on the characteristics of an input video. In this case, the CU corresponds to a TU.

A CU may be split in a quad-tree form. As a result, lower nodes, that is, a depth 1 (depth=1), are generated. Furthermore, a node (i.e., leaf node) no longer split from the lower node having the depth of 1 corresponds to a TU. For example, in FIG. 3(b), a TU(a), TU(b) and TU(j) corresponding to the nodes a, b and j have been once split from a CU, and have a depth of 1.

At least one of the nodes having the depth of 1 may be split again in a quad-tree form. As a result, lower nodes, that is, a depth 2 (i.e., depth=2), are generated. Furthermore, a node (i.e., leaf node) no longer split from the lower node having the depth of 2 corresponds to a TU. For example, in FIG. 3(b), a TU(c), TU(h) and TU(i) corresponding to the nodes c, h and i have been split twice from the CU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from a lower node having the depth of 3 corresponds to a CU. For example, in FIG. 3(b), a TU(d), TU(e), TU(f), TU(g) corresponding to the nodes d, e, f and g have been split from the CU three times, and have the depth of 3.

A TU having a tree structure may be hierarchically split based on predetermined highest depth information (or highest level information). Furthermore, each split TU may have depth information. The depth information may also include information about the size of the TU because it indicates the number of times and/or degree that the TU has been split.

With respect to one TU, information (e.g., a split TU flag (split_transform_flag)) indicating whether a corresponding TU has been split may be transferred to the decoder. The split information is included in all TUs other than a TU of the least size. For example, if the value of the flag indicating whether a TU has been split is '1', the corresponding TU is split into four TUs. If the value of the flag '0', the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra-frame prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter-prediction means a method of predicting the pixel value of the current processing block with reference to reconstructed regions within another reconstructed picture other than a current picture.

Hereinafter, intra-prediction is described in more detail.

Intra-Prediction (or Intra-Frame Prediction)

Figure 5:
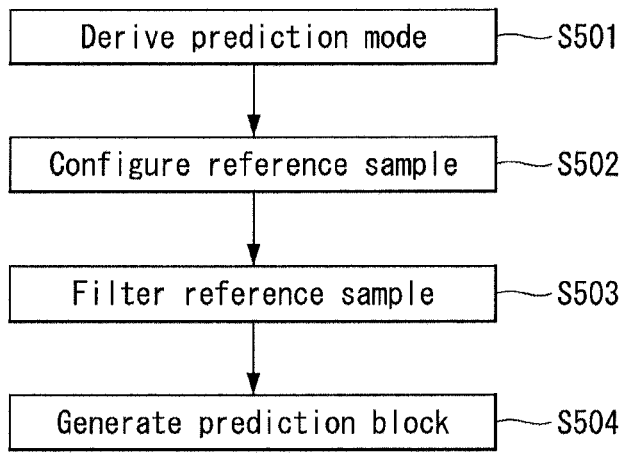
FIG. 5 is an embodiment to which the present invention is applied and is a diagram illustrating an intra-prediction method.

FIG. 5 is an embodiment to which the present invention is applied and is a diagram illustrating an intra-prediction method.

Referring to FIG. 5, the decoder derives an intra-prediction mode of a current processing block (S501).

In intra-prediction, there may be a prediction direction for the location of a reference sample used for prediction depending on a prediction mode. An intra-prediction mode having a prediction direction is referred to as intra-angular prediction mode "Intra_Angular prediction mode." In contrast, an intra-prediction mode not having a prediction direction includes an intra-planar (INTRA_PLANAR) prediction mode and an intra-DC (INTRA_DC) prediction mode.

Figure 6:
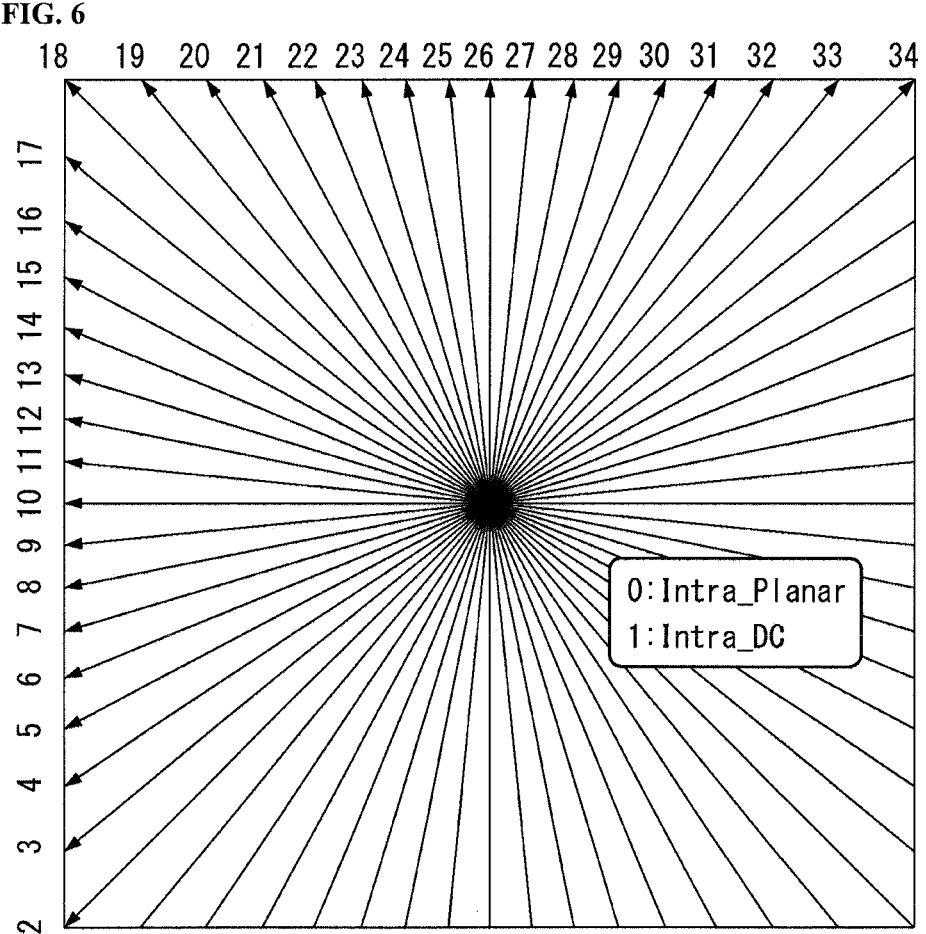
FIG. 6 illustrates prediction directions according to intra-prediction modes.

Table 1 illustrates intra-prediction modes and associated names, and FIG. 6 illustrates prediction directions according to intra-prediction modes.

TABLE 1

| INTRA PREDICTION MODE | ASSOCIATED NAMES |
| --- | --- |
| 0 | INTRA_PLANAR |
| 1 | INTRA_DC |
| 2 . . . 34 | INTRA_ANGULAR2 . . . INTRA_ANGULAR34 |

In intra-prediction, prediction may be on a current processing block based on a derived prediction mode. A reference sample used for prediction and a detailed prediction method are different depending on a prediction mode. Accordingly, if a current block is encoded in an intra-prediction mode, the decoder derives the prediction mode of a current block in order to perform prediction.

The decoder checks whether neighboring samples of the current processing block may be used for prediction and configures reference samples to be used for prediction (S502).

In intra-prediction, neighboring samples of a current processing block mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been decoded or may not be available. In this case, the decoder may configure reference samples to be used for prediction by substituting unavailable samples with available samples.

The decoder may perform the filtering of the reference samples based on the intra-prediction mode (S503).

Whether the filtering of the reference samples will be performed may be determined based on the size of the current processing block. Furthermore, a method of filtering the reference samples may be determined by a filtering flag transferred by the encoder.

The decoder generates a prediction block for the current processing block based on the intra-prediction mode and the reference samples (S504). That is, the decoder generates the prediction block for the current processing block (i.e., generates a prediction sample within the current processing block) based on the intra-prediction mode derived in the intra-prediction mode derivation step S501 and the reference samples obtained through the reference sample configuration step S502 and the reference sample filtering step S503.

If the current processing block has been encoded in the INTRA DC mode, in order to minimize the discontinuity of the boundary between processing blocks, at step S504, the left boundary sample of the prediction block (i.e., a sample within the prediction block neighboring the left boundary) and the top boundary sample (i.e., a sample within the prediction block neighboring the top boundary) may be filter.

Furthermore, at step S504, in the vertical mode and horizontal mode of the intra-angular prediction modes, as in the INTRA_DC mode, filtering may be applied to the left boundary sample or the top boundary sample.

This is described in more detail. If the current processing block has been encoded in the vertical mode or the horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for prediction may be much closer than the distance from the reference sample used for prediction.

Accordingly, the decoder may adaptively apply filtering on left boundary samples or top boundary samples depending on whether an intra-prediction direction is a vertical direction or a horizontal direction. That is, the decoder may apply filtering on the left boundary samples if the intra-prediction direction is the vertical direction, and may apply filtering on the top boundary samples if the intra-prediction direction is the horizontal direction.

As described above, in HEVC, for intra-frame prediction, the prediction block of a current block is generated using 33 types of angular prediction methods and 2 types of non-angular prediction methods, that is, a total of 35 types of prediction methods.

In the case of the 33 types of angular prediction modes, when a prediction sample is computed from reference samples, a reference sample value is duplicated to a corresponding prediction sample by taking each angle into consideration.

In contrast, in the case of a DC mode and planar mode, that is, the 2 types of non-angular prediction methods, a prediction sample is computed based on a weighted sum with the average value of each neighboring reference sample.

Figure 7:
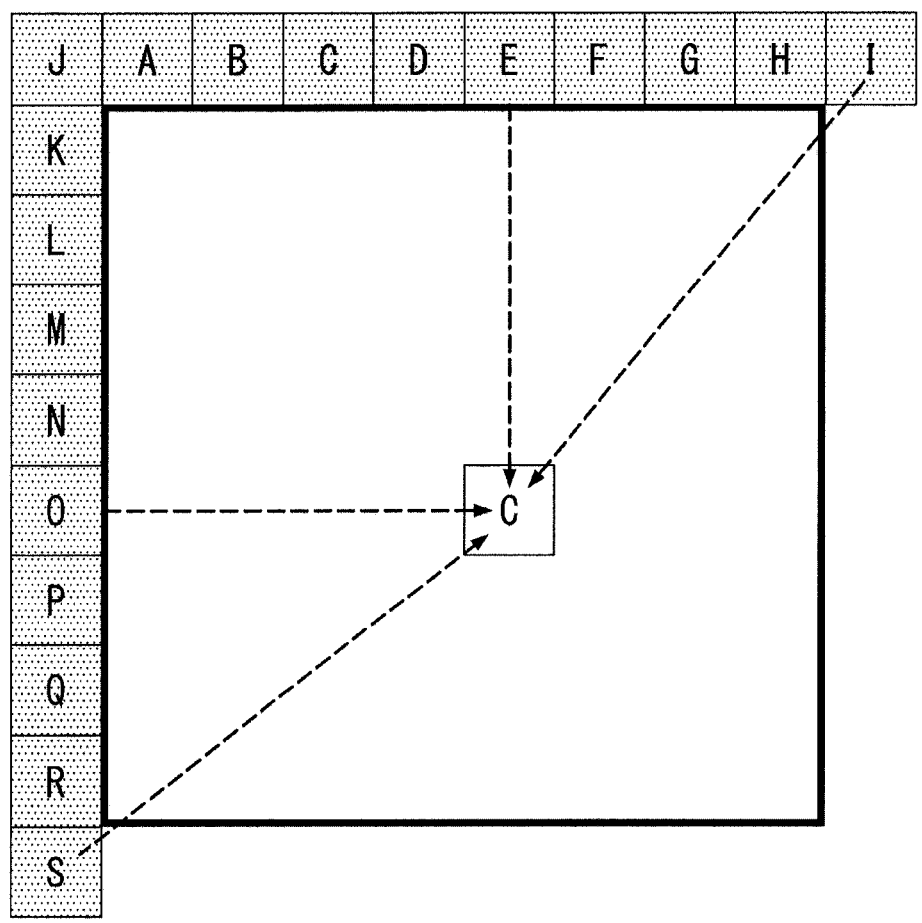
FIG. 7 is an embodiment to which the present invention may be applied, and illustrates a method of generating a prediction sample for a planar mode of an 8×8 TU.

FIG. 7 is an embodiment to which the present invention may be applied, and illustrates a method of generating a prediction sample for a planar mode of an 8×8 TU.

Equation 1 below illustrates an equation for generating a prediction sample in the planar mode.

$$predSamples[x][y]=((nT-1-x)*p[-1][y]+(x+1)*p[nT][-1]+(nT-1-y)*p[x][-1]+(y+1)*p[-1][nT]+nT)>>(Log\ 2(nT)+1)$$ [Equation 1]

In Equation 1, nT indicates the size of a transform unit TU.

Referring to FIG. 7 and Equation 1, the value of the current sample "C" (predSamples[x][y]) is determined to be a value obtained by right shifting the two's complement integer of the sum of the weighted sum of a reference sample "O" (p[−1][y]) and reference sample "I" (p[nT][−1]), the weighted sum of a reference sample "E" (p[x][−1]) and reference sample "S" (p[−1][nT]), and nT by a binary digit of Log 2(nT)+1.

In this case, in the case of the planar mode of HEVC, if 1) the values of neighboring reference samples are similar and/or if 2) a distribution of the values of neighboring left reference samples and a distribution of the values of top reference samples are different, the generation accuracy of a prediction sample is reduced.

The case of 1) corresponds to a case where the values of the neighboring reference sample are similar. Accordingly, the values of a prediction block generated in the planar mode and a prediction block generated in the DC mode are almost similar. In the case of 2), as may be seen from FIG. 8, if the values of a left reference samples 802 and top reference samples 801 are different (i.e., if the difference is greater than a threshold), the weighted sum of different reference samples generate different values never related to two reference samples.

In order to solve such a problem, the present invention proposes a common planar mode.

The common planar mode proposed by the present invention can predict a current pixel using various adjacent pixels in a common mode including the planar mode illustrated in FIG. 7.

That is, in the case of the planar mode of FIG. 7, adjacent pixels "E", "I", "O" and "S" are used to predict a pixel "C."

However, in the case of the common planar mode according to the present invention, in order to predict a pixel, an adjacent pixel may be selectively selected using a correlation with the adjacent pixel.

That is, in the common planar mode according to the present invention, the prediction value of a current pixel may be derived using one or more pixels selected from a reference pixel having the same x coordinates as the current pixel, a reference pixel having the same y coordinates as the current pixel, a reference pixel neighboring the left bottom of the current block, and a reference pixel neighboring the top right of the current block.

For example, referring back to FIG. 7, for the prediction of the current pixel "C", only "S" or only "O" may be used as an adjacent reference pixel. Furthermore, in a specific case, both "O" and "S" may be used, but in another specific case, both "O" and "S" may not be used. Furthermore, for the prediction of the current pixel "C", only "O" and "E" may be used as adjacent reference pixels. Furthermore, for the prediction of the current pixel "C", only "E" and "S" may be used or only "I" and "O" may be used.

Furthermore, predetermined weight or signaled weight may be applied to a pixel selected from the reference pixel having the same x coordinates as the current pixel (or prediction sample), the reference pixel having the same y coordinates as the current pixel, the reference pixel neighboring the left bottom of the current block, and the reference pixel neighboring the top right of the current block.

In the present invention, a planar mode in which an adjacent pixel is selectively used as described above is defined as the common planar mode.

Furthermore, which reference sample of reference samples configured near a current processing block will be used for prediction may be selected for each type of common planar mode. That is, a reference sample used for prediction may be selected for each type of common planar mode. In this case, the total of 35 intra-prediction modes defined in the existing HEVC are used. In the case of the planar mode, additional information (e.g., an index) indicating that which planar type is applied to a current processing block may be signaled by the encoder.

Furthermore, a different intra-prediction mode may be defined for each type of planar mode. That is, for example, a plurality of planar modes, such as an average planar mode, a vertical planar mode and a horizontal planar mode, may be defined. A reference sample used for prediction may be selected for each planar mode.

In this case, some of the total of 35 intra-prediction modes defined in the existing HEVC may be used to indicate planar types proposed by the present invention. Alternatively, an intra-prediction mode for indicating a planar mode proposed by the present invention may be defined in addition to the total of 35 intra-prediction modes defined in the existing HEVC. This is described in more detail later.

Figure 9:
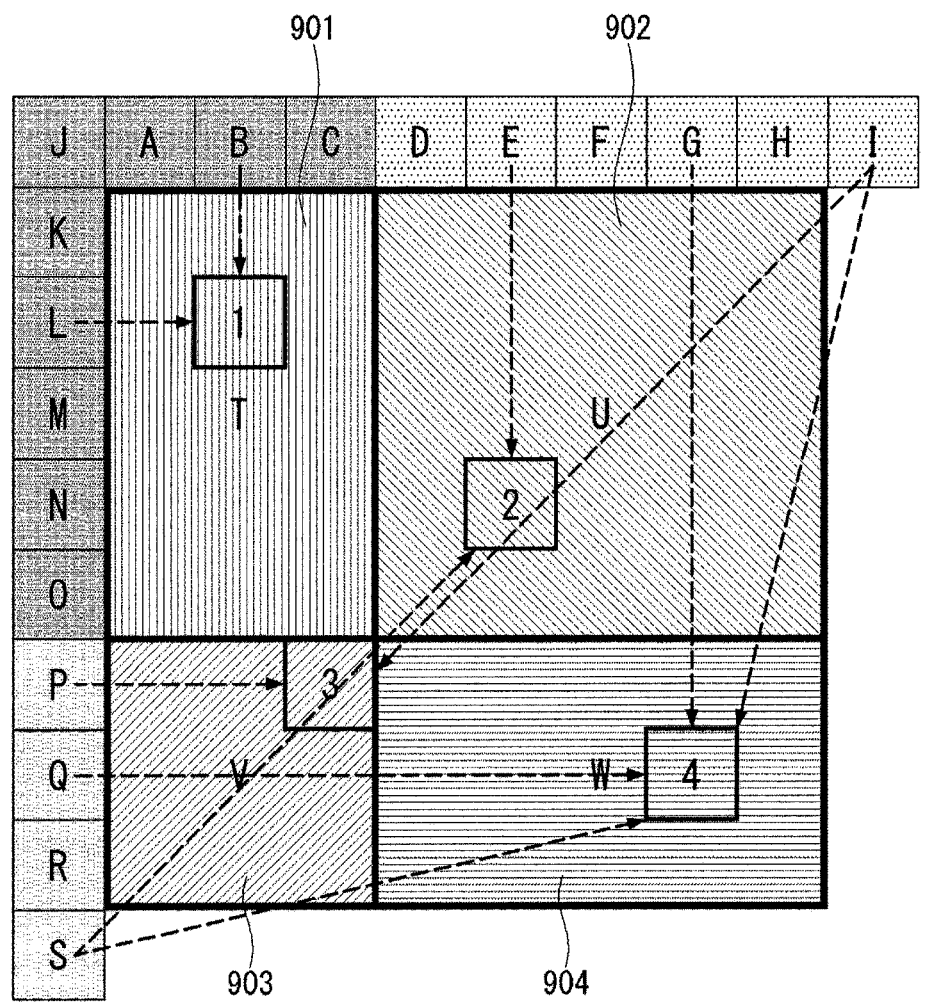
FIG. 9 illustrates a common planar mode according to an embodiment of the present invention.

FIG. 9 illustrates a common planar mode according to an embodiment of the present invention.

Referring to FIG. 9, a current block may be divided into a plurality of regions (or subblocks) depending on the values of neighboring reference pixels (or samples). In this case, the plurality of regions may not essentially have a square form and may have a rectangle form.

FIG. 9 illustrates a case where a current block is divided into four regions (T region 901, U region 902, V region 903 and W region 904) depending on the value of neighboring reference pixels.

Furthermore, the prediction value of a pixel within a corresponding region may be generated using a method determined for each block. That is, a reference pixel (or a combination of reference pixels) used for the intra-prediction of a pixel within a corresponding region may be determined for each divided block.

Referring back to FIG. 9, in the case of the prediction of a pixel included in the T region 901, a prediction value may be generated based on only the mean of neighboring pixels without using a reference pixel. That is, a prediction value may be generated based on only the mean of a reference pixel having the same x coordinates as a corresponding pixel and a reference pixel having the same y coordinates. For example, the prediction value of a pixel 1 may be calculated as the mean of adjacent pixels B and L. Hereinafter, such a planar mode is referred to as an average planar type (or mode).

In the case of the prediction of a pixel included in the U region 902, a prediction value may be generated using some of the left and top reference pixels. That is, the prediction value may be generated without using the left reference pixel. For example, in the case of a pixel 2, a prediction value may be calculated using E and S values. Hereinafter, such a planar mode is referred to as a vertical planar type (or mode). This is described in more detail later.

In the case of the prediction of a pixel included in the V region 903, a prediction value may be generated using some of the left and top reference pixels. That is, the prediction value may be generated without using the top reference pixel. For example, in the case of a pixel 3, a prediction value may be calculated using P and I values. This is referred to as a horizontal planar type (or mode) and is described in more detail later.

In the case of the prediction of a pixel included in the W region 904, a prediction value may be generated using all the reference pixels used in the existing planar method. For example, in the case of a pixel 4, a prediction value may be calculated using G, I, Q and S values as in the existing planar method. This is referred to as a basic planar type (or mode).

As described above, the common planar mode according to the present invention may be computed using various methods for each block within a corresponding block as in the example of FIG. 9.

Hereinafter, the vertical planar type (or mode) and the horizontal planar type (or mode), that is, embodiments of the common planar mode, are described in detail.

In this case, the two types of the planar types (or modes) are chiefly described, for convenience of description, but the present invention is not limited thereto. That is, the common planar mode according to the present invention is a concept including all of modes in which a prediction sample is generated using one or more reference samples selected from a reference sample having the same x coordinates as the prediction sample, a reference sample having the same y coordinates as the prediction sample, a reference sample neighboring the left bottom of a current processing block, and a reference sample neighboring the top right of the current processing block.

Figure 8:
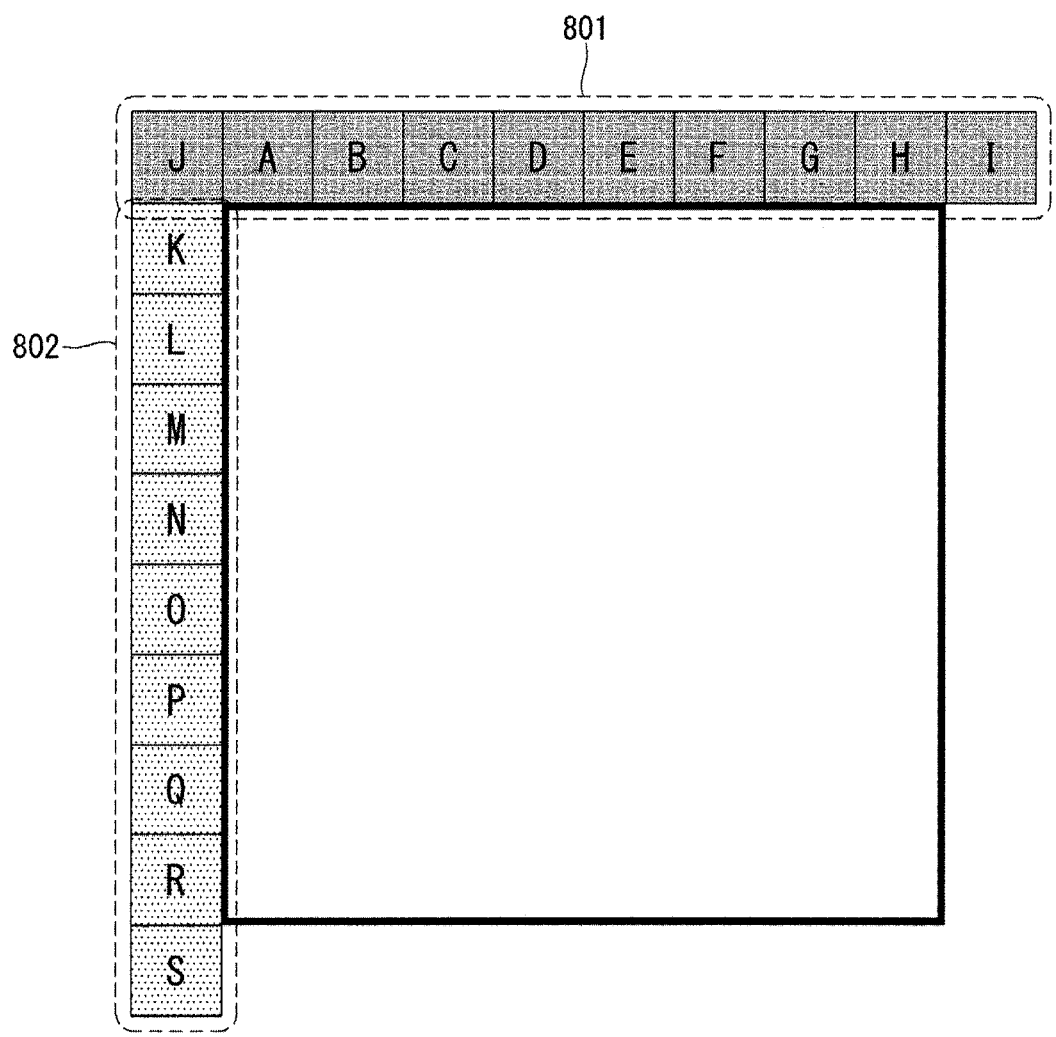
FIG. 8 is an embodiment to which the present invention may be applied, and illustrates a prediction sample for a planar mode of an 8×8 TU.

If a difference between a top reference sample value and a left reference sample value is great as in FIG. 8, only the top reference sample value is used (i.e., vertical planar mode) or only the left reference sample (i.e., horizontal planar mode) may be used without using both the left and top reference samples as in the planar mode of FIG. 7. That is, the vertical planar mode or the horizontal planar mode may be used as a common planar mode for a block having strong vertical and horizontal components.

1) Horizontal Planar Mode

Figure 10:
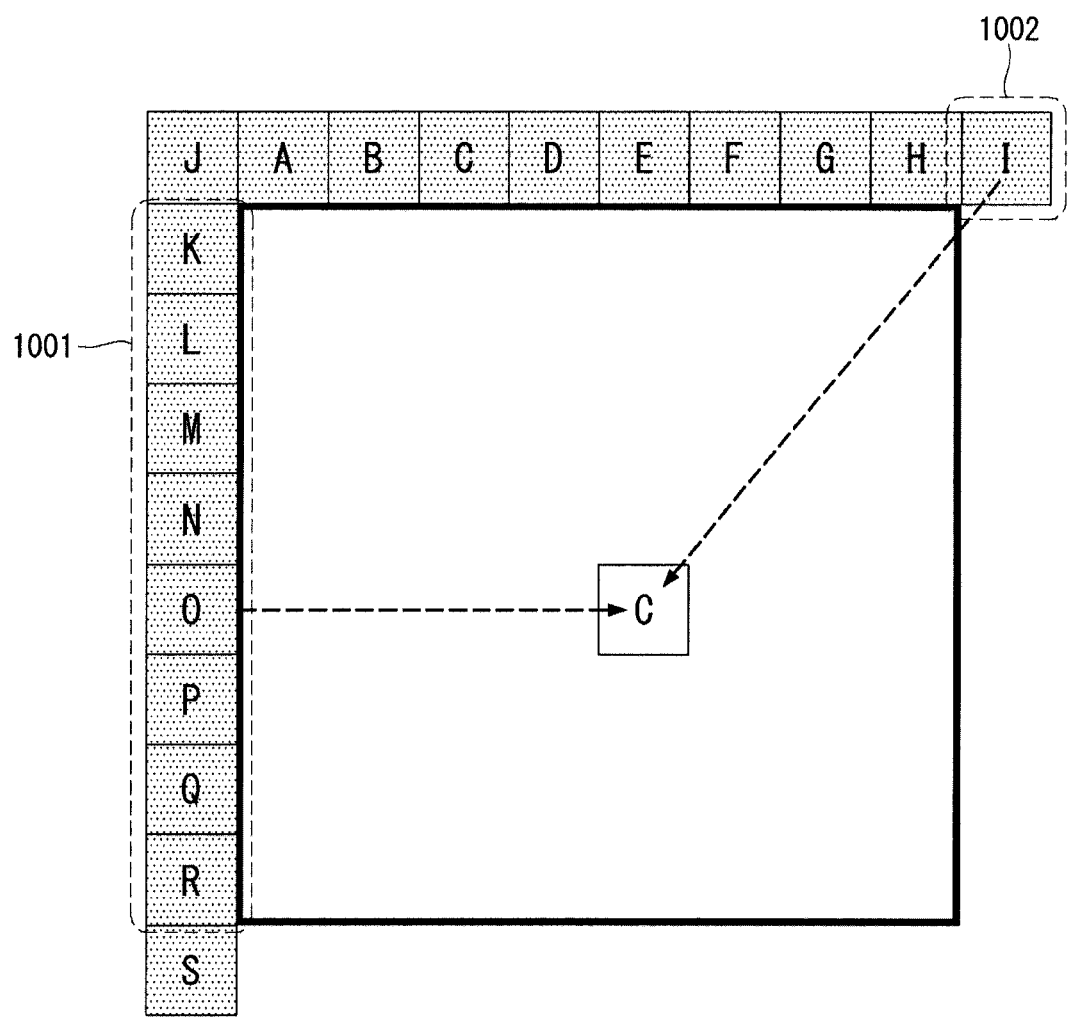
FIG. 10 is a diagram illustrating a horizontal planar mode according to an embodiment of the present invention.

FIG. 10 is a diagram illustrating a horizontal planar mode according to an embodiment of the present invention.

Referring to FIG. 10, in the horizontal planar mode, a prediction sample may be generated using the weighted sum of left reference samples K-R 1001 and a top right reference sample I 1002. That is, the prediction block may be generated by not taking into consideration the value of the top reference samples A-H.

Equation 2 illustrates a prediction sample generation equation for the horizontal planar mode.

$$predSamples[x][y]=((nT-1-x)*p[-1][y]+(x+1)*p[nT][-1]+nT/2)>>Log\ 2(nT) \quad \text{[Equation 2]}$$

In Equation 2, nT indicates the size of a block.

As described above, a current block is divided into a plurality of regions, and the horizontal planar mode may be applied to a specific region of the divided regions. In this case, nT indicates the size of a corresponding region.

In this case, if the region to which the horizontal planar mode is applied has a rectangle form, nT may be the horizontal size or vertical size of the corresponding region.

Referring to FIG. 10 and Equation 2, the value of a current sample "C" (predSamples[x][y]) may be determined to be a value obtained by right shifting the two's complement integer of the sum of the weighted sum of a reference sample "O" (p[−1][y]) and reference sample "I" (p[nT][−1]) and nT/2 by a binary digit of Log 2(nT).

As described above, predetermined weight or signaled weight may be applied to a selected reference sample. That is, the horizontal planar mode may be considered to be a case where weight of 1 has been applied to the weighted sum of a reference sample having the same y coordinates as a prediction sample and a reference sample neighboring the top right of a current processing block and weight of 0 has been applied to the weighted sum of a reference sample having the same x coordinates as the prediction sample and a reference sample neighboring the left bottom of the current processing block.

2) Vertical Planar Mode

Figure 11:
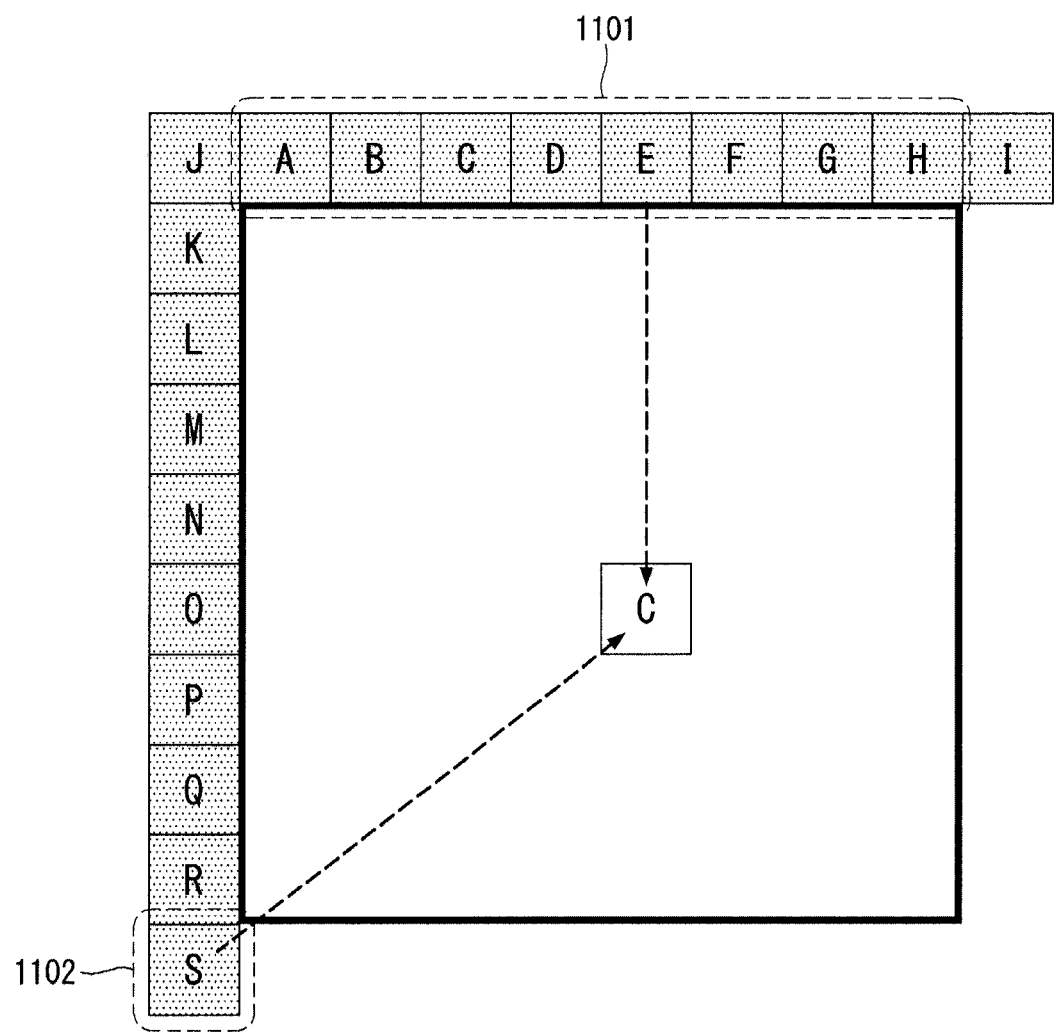
FIG. 11 is a diagram illustrating a vertical planar mode according to an embodiment of the present invention.

FIG. 11 is a diagram illustrating a vertical planar mode according to an embodiment of the present invention.

Referring to FIG. 11, in the vertical planar mode, a prediction sample may be generated using the weighted sum of top reference samples A-H 1101 and a left bottom reference sample S 1002. That is, the prediction block may be generated without taking into consideration the value of left reference samples K-R.

Equation 3 illustrates a prediction sample generation equation for the vertical planar mode.

$$predSamples[x][y]=((nT-1-y)*p[x][-1]+(y+1)*p[-1][nT]+nT/2)>>Log\,2(nT) \qquad [Equation\ 3]$$

In Equation 2, nT indicates the size of a block.

As described above, a current block may be divided into a plurality of regions, and the vertical planar mode may be applied to a specific region of the divided regions. In this case, nT indicates the size of a corresponding region.

In this case, if the region to which the vertical planar mode is applied has a rectangle form, nT may be the horizontal size or vertical size of the corresponding region.

Referring to FIG. 11 and Equation 3, the value of a current sample "C" (predSamples[x][y]) may be determined to be a value obtained by right shifting the two's complement integer of the sum of the weighted sum of a reference sample "E" (p[x][−1]) and reference sample "S" (p[−1][nT]) and nT/2 by a binary digit of Log 2(nT).

As described above, predetermined weight or signaled weight may be applied to a selected reference sample. That is, the vertical planar mode may be considered to be a case where weight of 1 has been applied to the weighted sum of a reference sample having the same x coordinates as a prediction sample and a reference sample neighboring the left bottom of a current processing block and weight of 0 has been applied to the weighted sum of a reference sample having the same y coordinates as the prediction sample and a reference sample neighboring the top right of the current processing block.

As described above, in accordance with the present invention, unlike in the existing planar mode, in the horizontal planar mode and the vertical planar mode, prediction blocks are generated using only a left reference sample and a top reference sample, respectively. Accordingly, if a left reference sample and a top reference sample have different characteristics, unlike in the existing planar mode, a prediction block into which the characteristics of corresponding reference samples have been well incorporated using the horizontal planar mode and the vertical planar mode can be generated. That is, prediction performance can be improved.

Hereinafter, a method of adding each planar mode to intra-frame prediction encoding according to an embodiment of the present invention is described.

If types of a plurality of planar modes are defined as described above, additional information may be signaled for each type of planar mode. For example, the existing 35 intra-prediction modes of HEVC may be identically used.

In contrast, if an intra-prediction mode is defined for each type of planar mode, for example, the existing 35 intra-prediction modes of HEVC cannot be identically used. Accordingly, the present invention proposes 1) a method of substituting the existing mode with a new mode or 2) a method of adding a new mode to the existing mode as a method of applying a new planar mode to intra-frame prediction encoding.

Hereinafter, a method of adding the horizontal planar mode and the vertical planar mode, described as embodiments of the common planar mode, to intra-frame prediction encoding is described for convenience of description, but the present invention is not limited thereto.

1) Method of Substituting Existing Mode with New Mode

HEVC has a total of 35 modes, that is, the 33 types of angular modes and the 2 types of non-angular modes.

Two of the existing 33 angular modes may be substituted with the new horizontal planar mode and vertical planar mode proposed by the present invention.

Figure 12:
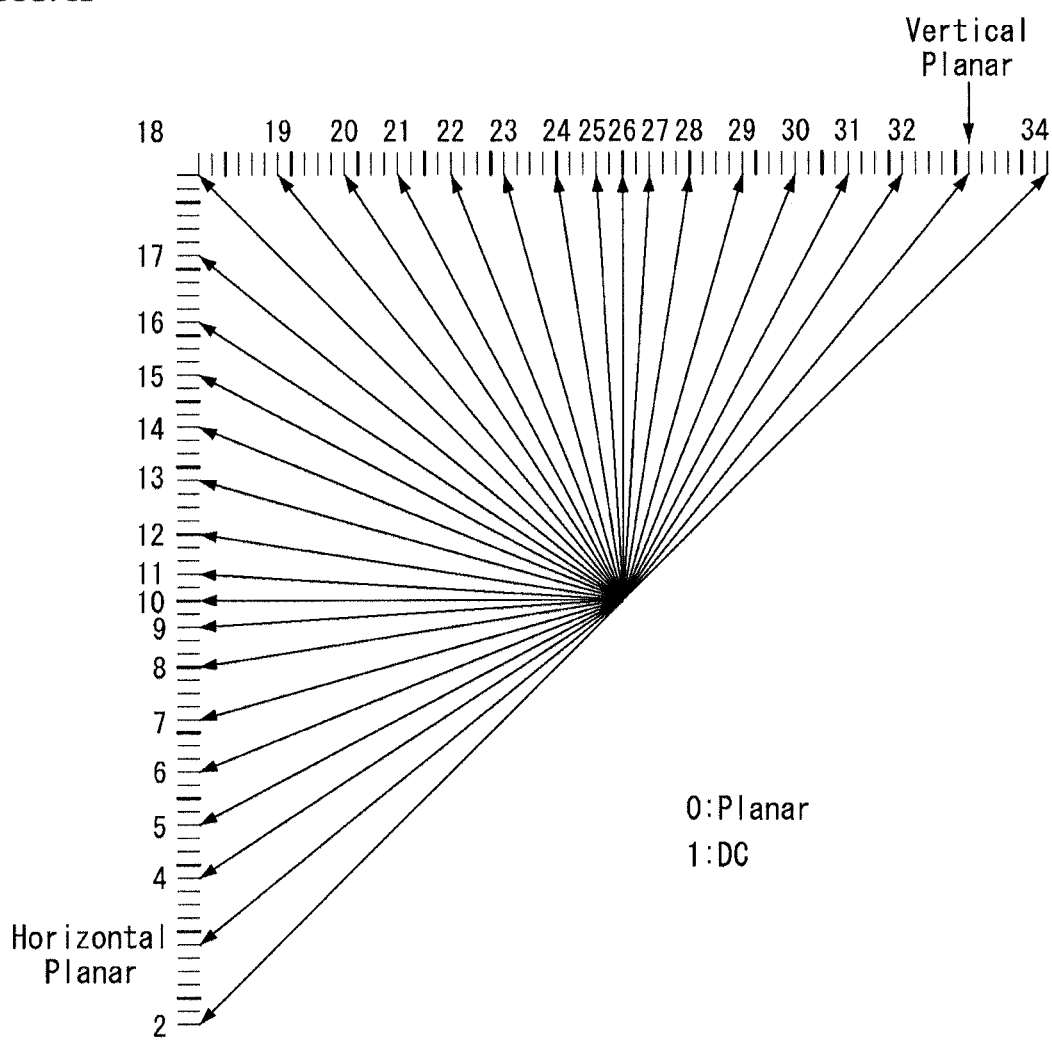
FIG. 12 illustrates an intra-prediction mode according to an embodiment of the present invention.

FIG. 12 illustrates an intra-prediction mode according to an embodiment of the present invention.

FIG. 12 illustrates a case where the No. 3 and No. 33 modes in the existing intra-prediction direction have been substituted with the horizontal planar mode and the vertical planar mode.

As in FIG. 12, for example, if frequency that the No. 3 mode and No. 33 mode of the 33 types of angular modes are generated is low, the two intra-prediction modes may be substituted with the horizontal planar mode and the vertical planar mode. That is, the existing two angular modes are substituted with the horizontal planar mode and the vertical planar mode, respectively. However, the angle of an intra-prediction mode (the No. 3 and No. 33 modes in FIG. 12) to be substituted is not applied to the horizontal planar mode and the vertical planar mode.

In such a case, since the existing modes are substituted with the horizontal planar mode and the vertical planar mode, the existing method may be identically applied to a method of signaling a most probable mode (MPM) index and encoding an intra-frame intra-prediction mode.

2) Method of Adding New Mode to Existing Mode

In the aforementioned method of substituting the existing mode with a new mode, the existing two angular modes substituted with the new planar modes cannot be used because the existing two modes having angles are substituted with the horizontal planar mode and the vertical planar mode proposed by the present invention.

In order to solve such a problem, there is proposed a method of adding a new mode to an existing mode. In this method, the horizontal planar mode and the vertical planar mode may be newly added in addition to the existing angle modes. That is, in the method proposed by the present embodiment, new intra-frame prediction encoding modes may be generated by adding the two new modes to non-angular modes.

Figure 13:
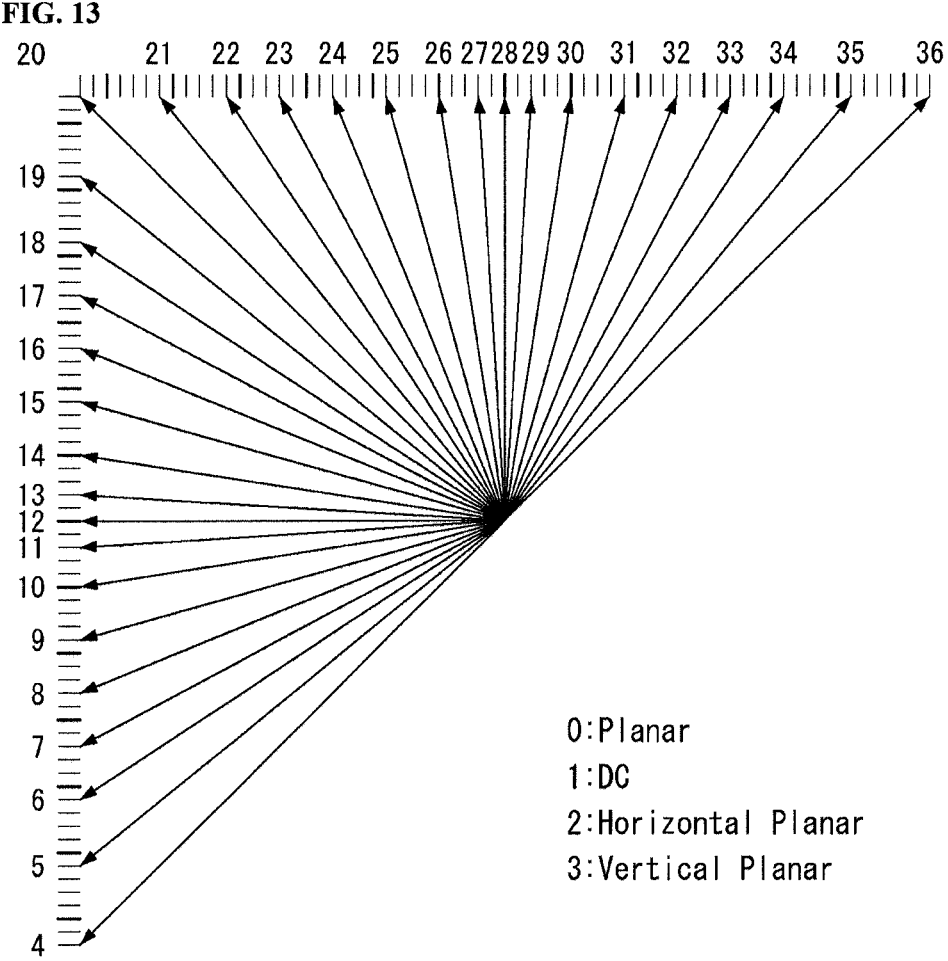
FIG. 13 illustrates an intra-prediction mode according to an embodiment of the present invention.

FIG. 13 illustrates an intra-prediction mode according to an embodiment of the present invention.

As in FIG. 13, the new horizontal planar mode and vertical planar mode proposed by the present invention may be considered as non-angular modes and may be located in front of angular modes like the existing planar and DC modes. That is, an intra-prediction mode 2 may indicate the horizontal planar mode, and an intra-prediction mode 3 may indicate the vertical planar mode. Furthermore, intra-prediction modes 4 to 36 and an intra-angular mode 4 to an intra-angular mode 36 may be indicated.

Alternatively, the horizontal planar mode and the vertical planar mode may be added between the existing angle modes and used.

Figure 14:
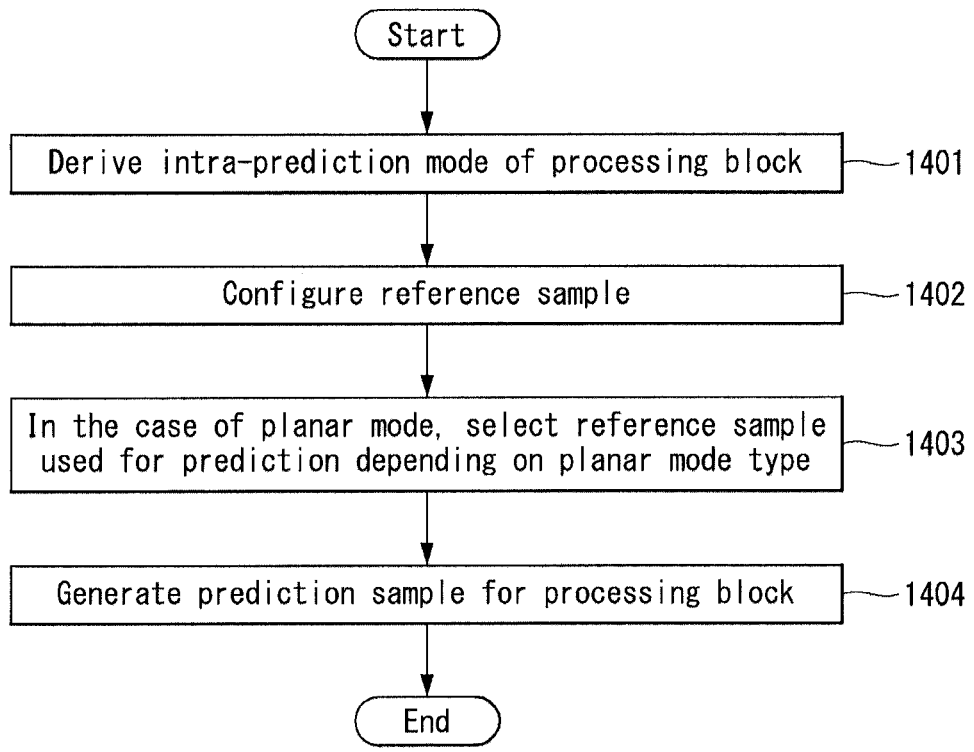
FIG. 14 is a diagram illustrating an intra-prediction method according to an embodiment of the present invention.

FIG. 14 is a diagram illustrating an intra-prediction method according to an embodiment of the present invention.

Referring to FIG. 14, the decoder derives an intra-prediction mode of a current processing block (S1401).

As described above, the intra-prediction mode may have a prediction angle for the location of a reference sample used for prediction depending on a prediction mode and may not have an angle.

In this case, if a different intra-prediction mode is defined for each type of planar mode, some of the existing 35 intra-prediction modes of HEVC may be substituted in order to indicate the type of each planar mode or an additional intra-prediction mode may be defined in order to indicate the type of each planar mode.

The decoder checks whether neighboring samples of the current processing block may be used for prediction, and configures reference samples to be used for prediction (S1402).

In intra-prediction, the neighboring samples of the current processing block may mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

In this case, some of the neighboring samples of the current processing block have not yet been decoded or may not be available. In this case, the decoder may configure the reference samples to be used for prediction by substituting unavailable samples with available samples.

Furthermore, the decoder may perform the filtering of the reference samples based on an intra-prediction mode. Whether the filtering of the reference samples will be performed may be determined based on the size of the current processing block. Furthermore, the method of filtering the reference samples may be determined by a filtering flag transferred by the encoder.

If the intra-prediction mode of the current processing block is a planar mode, the decoder selects a reference sample used for prediction depending on the type of planar mode (S1403).

In this case, information indicative of the type of planar mode applied to the current processing block may be additionally signaled by the encoder. Furthermore, the decoder may derive the type of planar mode applied to the current processing block from the information, and may select the reference sample used for prediction depending on the type of derived planar mode.

Alternatively, as described above, a different intra-prediction mode may be defined for each type of planar mode. In this case, the decoder may select the reference sample used for prediction based on the intra-prediction mode derived at step S1401.

That is, one or more reference samples used for prediction may be selected from a reference sample having the same x coordinates as a prediction sample within the current processing block, a reference sample having the same y coordinates as the prediction sample within the current processing block, a reference sample neighboring the left bottom of the current processing block, and a reference sample neighboring the top right of the current processing block depending on the type of planar mode (or intra-prediction mode).

For example, if the type of planar mode (or intra-prediction mode) is the horizontal planar type (or horizontal planar mode), the decoder may select a reference sample having the same y coordinates as a prediction sample and a reference sample neighboring the top right of a processing block.

Alternatively, if the type of planar mode (or intra-prediction mode) is the vertical planar type (or vertical planar mode), the decoder may select a reference sample having the same x coordinates as a prediction sample and a reference sample neighboring the left bottom of a processing block.

Alternatively, if the type of planar mode (or intra-prediction mode) is the average planar type (or average planar mode), the decoder may select a reference sample having the same x coordinates as a prediction sample and a reference sample having the same y coordinates as the prediction sample.

Alternatively, if the type of planar mode (or intra-prediction mode) is the basic planar type (or basic planar mode), the decoder may select a reference sample having the same x coordinates as a prediction sample, a reference sample having the same y coordinates as the prediction sample, a reference sample neighboring the left bottom of a processing block and a reference sample neighboring the top right of the processing block.

The decoder generates a prediction sample for the current processing block using the selected reference sample (S1404).

For example, if the type of planar mode (or intra-prediction mode) is the horizontal planar type (or horizontal planar mode), the decoder may derive the value of a prediction sample as in Equation 2 using the value of a reference sample having the same y coordinates as the prediction sample and a reference sample value neighboring the top right of a processing block.

Alternatively, if the type of planar mode (or intra-prediction mode) is the vertical planar type (or vertical planar mode), the decoder may derive the value of a prediction sample as in Equation 3 using the value of a reference sample having the same x coordinates as the prediction sample and the value of a reference sample neighboring the left bottom of a processing block.

Alternatively, if the type of planar mode (or intra-prediction mode) is the average planar type (or average planar mode), the decoder may derive the value of a prediction sample by averaging the value of a reference sample having the same x coordinates as the prediction sample and the value of a reference sample having the same y coordinates as the prediction sample.

Alternatively, if the type of planar mode (or intra-prediction mode) is the basic planar type (or basic planar mode), the decoder may derive the value of a prediction sample as in Equation 1 using the values of a reference sample having the same x coordinates as the prediction sample, a reference sample having the same y coordinates as the prediction sample, a reference sample neighboring the left bottom of a processing block and a reference sample neighboring the top right of the processing block.

Furthermore, the decoder may derive the value of the prediction sample by applying predetermined weight or weight signaled by the encoder to the value of the reference sample selected at step S1403.

Furthermore, as in the example of FIG. 9, the current processing block may be divided into a plurality of regions, and the type of planar mode (or intra-prediction mode) may be applied to each of the blocks. In this case, the decoder may individually select a reference sample used for prediction depending on the type of planar mode (or intra-prediction mode) applied to each block. Furthermore, the decoder may generate a prediction sample using a reference sample selected for each block.

Meanwhile, in FIG. 14, only the intra-prediction method has been illustrated if the common planar mode proposed by the present invention is applied. If an intra-prediction mode other than the common planar mode is applied to a current processing block, the intra-prediction method illustrated in FIG. 5 may be identically used.

Figure 15:
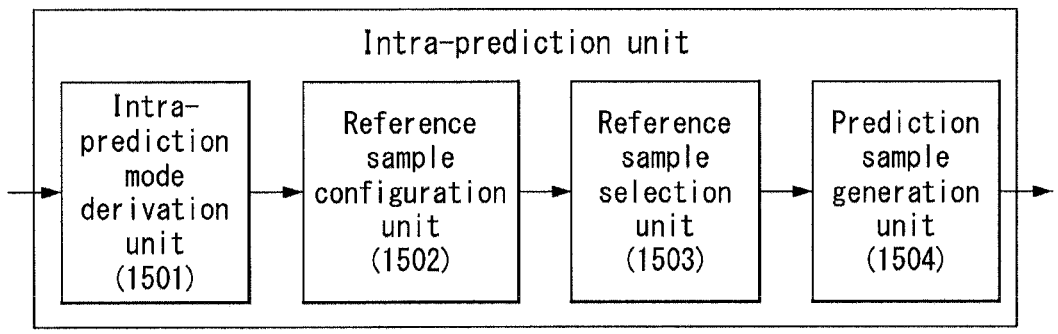
FIG. 15 is a detailed diagram illustrating an intra-prediction unit according to an embodiment of the present invention.

FIG. 15 is a detailed diagram illustrating an intra-prediction unit according to an embodiment of the present invention.

In FIG. 15, the intra-prediction unit 182 (refer to FIG. 1), 262 (refer to FIG. 2) has been illustrated as being a single block, for convenience of description, but the intra-prediction unit 182, 262 may be implemented as an element included in the encoder and/or the decoder.

Referring to FIG. 15, the intra-prediction unit 182, 262 implements the functions, processes and/or methods proposed in FIGS. 9 to 14. Specifically, the intra-prediction unit 182, 262 may be configured to include an intra-prediction mode derivation unit 1501, a reference sample configuration unit 1502, a reference sample selection unit 1503 and a prediction sample generation unit 1504.

The intra-prediction mode derivation unit 1501 derives an intra-prediction mode of a current processing block.

If a different intra-prediction mode is defined for each type of planar mode as described above, some of the existing 35 intra-prediction modes of HEVC may be substituted in order to indicate the type of each planar mode or an additional intra-prediction mode may be defined in order to indicate the type of each planar mode.

The reference sample configuration unit 1502 checks whether neighboring samples of a current processing block may be used for prediction, and configures reference samples to be used for prediction.

In this case, some of the neighboring samples of the current processing block may have not been decoded or may not be available. In this case, the decoder may configure the reference samples to be used for prediction by substituting unavailable samples with available samples.

Furthermore, the decoder may perform the filtering of the reference samples based on an intra-prediction mode. Whether the filtering of the reference samples will be performed may be determined based on the size of the current processing block. Furthermore, a method of filtering the reference samples may be determined by a filtering flag transferred by the encoder.

The reference sample selection unit 1503 selects a reference sample used for prediction depending on the type of planar mode if an intra-prediction mode of a current processing block is a planar mode.

For example, if the type of planar mode (or intra-prediction mode) is the horizontal planar type (or horizontal planar mode), the reference sample selection unit 1503 may select a reference sample having the same y coordinates as a prediction sample and a reference sample neighboring the top right of a processing block.

Alternatively, if the type of planar mode (or intra-prediction mode) is the vertical planar type (or vertical planar mode), the reference sample selection unit 1503 may select a reference sample having the same x coordinates as a prediction sample and a reference sample neighboring the left bottom of a processing block.

Alternatively, if the type of planar mode (or intra-prediction mode) is the average planar type (or average planar mode), the reference sample selection unit 1503 may select a reference sample having the same x coordinates as a prediction sample and a reference sample having the same y coordinates as the prediction sample.

Alternatively, if the type of planar mode (or intra-prediction mode) is the basic planar type (or basic planar mode), the reference sample selection unit 1503 may select a reference sample having the same x coordinates as a prediction sample, a reference sample having the same y coordinates as the prediction sample, a reference sample neighboring the left bottom of a processing block and a reference sample neighboring the top right of the processing block.

The prediction sample generation unit 1504 generates a prediction sample for a current processing block using a selected reference sample.

For example, if the type of planar mode (or intra-prediction mode) is the horizontal planar type (or horizontal planar mode), the prediction sample generation unit 1504 may derive the value of a prediction sample as in Equation 2 using the value of a reference sample having the same y coordinates as the prediction sample and the value of a reference sample neighboring the top right of a processing block.

Alternatively, if the type of planar mode (or intra-prediction mode) is the vertical planar type (or vertical planar mode), the prediction sample generation unit 1504 may derive the value of a prediction sample as in Equation 3 using the value of a reference sample having the same x coordinates as the prediction sample and the value of a reference sample neighboring the left bottom of a processing block.

Alternatively, if the type of planar mode (or intra-prediction mode) is the average planar type (or average planar mode), the prediction sample generation unit 1504 may derive the value of a prediction sample by averaging the value of a reference sample having the same x coordinates as the prediction sample and the value of a reference sample having the same y coordinates as the prediction sample.

Alternatively, if the type of planar mode (or intra-prediction mode) is the basic planar type (or basic planar mode), the prediction sample generation unit 1504 may derive the value of a prediction sample as in Equation 1 using the values of a reference sample having the same x coordinates as the prediction sample, a reference sample having the same y coordinates as the prediction sample, a reference sample neighboring the left bottom of a processing block and a reference sample neighboring the top right of the processing block.

Furthermore, the prediction sample generation unit 1504 may derive the value of a prediction sample by applying predetermined weight or weight signaled by the encoder to a selected reference sample value.

Meanwhile, if an intra-prediction mode for a current processing block is not the common planar mode proposed by the present invention, the reference sample selection unit 1503 may not perform the aforementioned operation. That is, the prediction sample generation unit 1504 may generate a prediction sample for a current processing block based on reference samples configured by the reference sample configuration unit 1502.

Encoding/Decoding Method Based on an Intra-Prediction Mode

If a block to be now decoded has been encoded in an intra-frame encoding mode (i.e., intra-prediction mode), as in step S501 in the example of FIG. 5, the decoder requires information of the intra-prediction mode (angular or DC or Planar mode, refer to Table 1 and FIG. 12 or 13) of a corresponding block in order to generate a prediction block.

Figure 16:
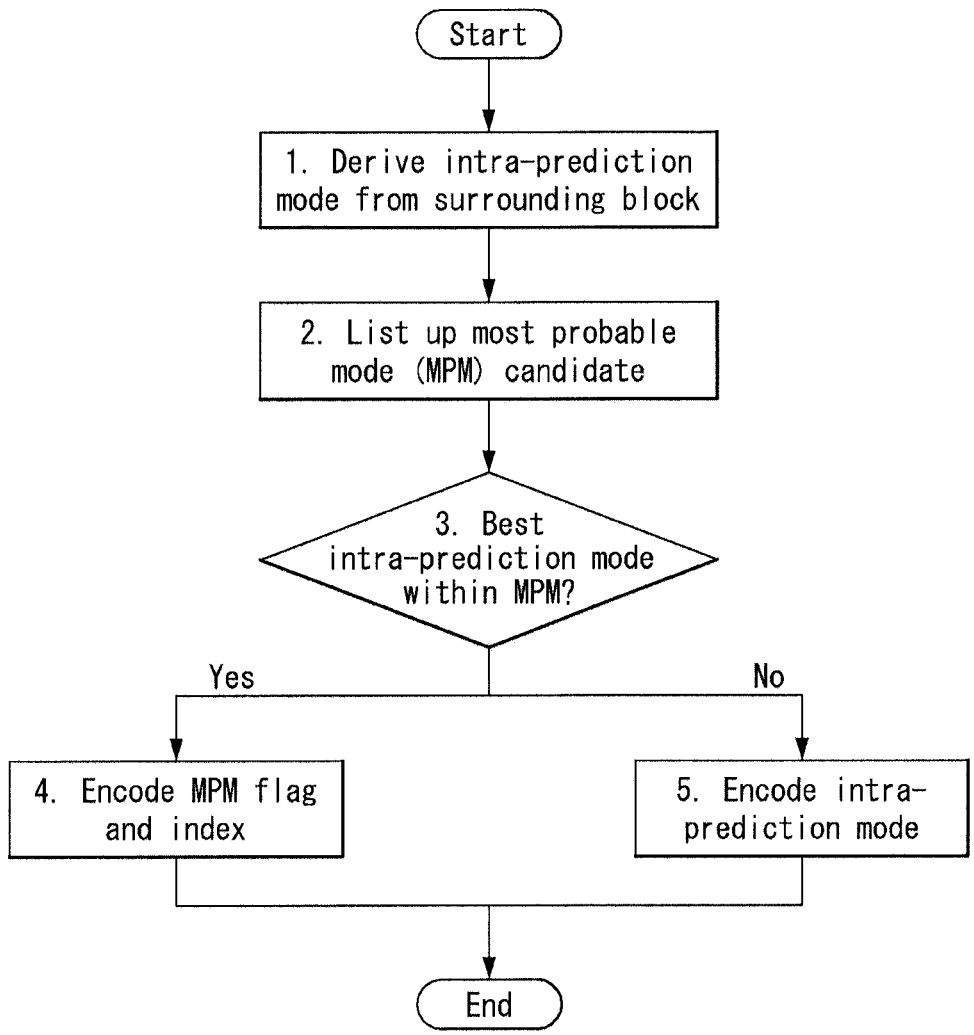
FIG. 16 is an embodiment to which the present invention may be applied and is a diagram illustrating an intra-prediction mode encoding method.

FIG. 16 is an embodiment to which the present invention may be applied and is a diagram illustrating an intra-prediction mode encoding method.

1. The encoder first derives intra-prediction mode information from a surrounding block if the surrounding block has been intra-encoded.

2. The encoder lists up a most probable mode (MPM) candidate (or MPM list) using the intra-prediction mode information of the surrounding block.

If intra-frame encoding is to be performed, a loss of redundant information can be prevented by taking into consideration similarity between a surrounding block and a current encoding block, thereby being capable of improving encoding efficiency. Such a method may also be used for the transmission of encoding mode information. This is referred to as most probable modes (MPMs).

Surrounding blocks have a very high probability that they will have similar intra-prediction modes because they are located near a current block. Accordingly, a current encoding mode may be represented using the modes of surrounding blocks.

In this case, a left block and top block having the best possibility that they will be used to decode a current block (having the best possibility that they have already been decoded) may be used as the surrounding block.

An MPM candidate may configured as a total of three intra-prediction modes.

In this case, if the intra-prediction mode of a left neighboring block and the intra-prediction mode of a top neighboring block are not the same, the intra-prediction mode of the left neighboring block may be determined as a first MPM candidate, the intra-prediction mode of the top neighboring block may be determined as a second MPM candidate, and any one of a Planar mode, DC mode and intra-vertical mode may be determined as a third MPM candidate.

If the intra-prediction mode of a left neighboring block and the ultra-prediction mode of a top neighboring block are the same and a corresponding overlapped mode is smaller than 2 (i.e., planar mode or DC mode, refer to Table 1), the planar mode may be determined as a first MPM candidate, the DC mode may be determined as a second MPM candidate, and a vertical mode (e.g., No. 26 mode in FIG. 6) may be determined as a third MPM candidate.

In contrast, if the intra-prediction mode of a left neighboring block and the intra-prediction mode of a top neighboring block are the same and a corresponding overlapped mode is not smaller than 2, an overlapped intra-prediction mode may be determined as a first MPM candidate, and two modes neighboring the overlapped intra-prediction mode may be determined as a second MPM candidate and a third MPM candidate.

3. The encoder determines whether the best intra-prediction mode to be applied to a current block belongs to the configured MPM candidates.

4. If the intra-prediction mode of the current block belongs to the MPM candidates, the encoder codes an MPM flag and an MPM index.

In this case, the MPM flag may indicate whether the intra-prediction mode of the current block has been derived from a surrounding intra-predicted block (i.e., the intra-prediction mode of the current block belongs to an MPM).

Furthermore, the MPM index may indicate that which MPM mode of the MPM candidates configured at step 2 is applied as the intra-prediction mode of the current block.

5. In contrast, if the intra-prediction mode of the current block does not belong to the MPM candidates, the encoder codes the intra-prediction mode of the current block.

Figure 17:
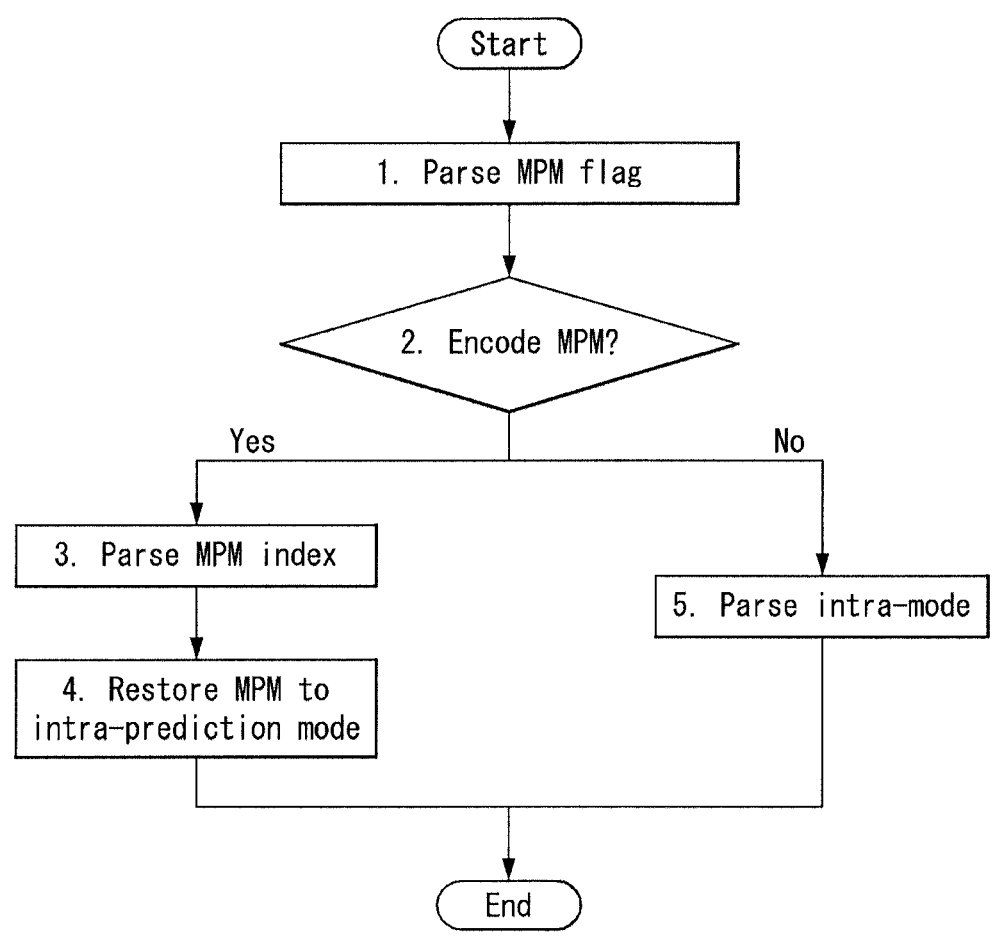
FIG. 17 is an embodiment to which the present invention may be applied and is a diagram illustrating an intra-prediction mode decoding method.

FIG. 17 is an embodiment to which the present invention may be applied and is a diagram illustrating an intra-prediction mode decoding method.

1. The decoder parses an MPM flag.

2. The decoder checks whether MPM encoding has been applied to a current block by parsing the MPM flag.

That is, the decoder checks whether the intra-prediction mode of the current block belongs to an MPM candidate consisting of the mode of the intra-predicted block of a neighboring block.

3. If MPM encoding has been applied to the current block, the decoder parses an MPM index.

4. Furthermore, the decoder may restore an MPM mode indicated by the MPM index as an intra-prediction mode for the current block.

5. In contrast, if MPM encoding has not been applied to the current block, the decoder parses an intra-prediction mode for the current block.

If an MPM is used as described above, assuming that the number of encoding modes is N, minimum bits for representing the N encoding modes is Log 2(N). In contrast, the number of bits smaller than the number of intra-prediction modes is assigned to the MPM. Accordingly, the mode of a current block may be represented using much smaller bits.

For example, assuming that the number of intra-prediction modes is 35 and the number of MPMs is 3, if an MPM mode is never used, information of 6 bits must be transmitted in order to represent the 35 intra-prediction modes. In contrast, if 3 MPMs are used and the intra-prediction mode of a current block is one of MPM candidates, information can be transferred using only 2 bits. An intra-prediction mode may be represented using only 5 bits because one of the remaining 32 intra-prediction modes except three intra-prediction modes capable of representing an MPM although it is not an MPM mode has been selected.

In this case, when an MPM candidate is configured as described above, neighboring blocks used include only a left neighboring block and a top neighboring block. Accordingly, the probability that the intra-prediction mode of a current block will belong to an MPM candidate may be low. As described above, if the intra-prediction mode of a current block does not belong to an MPM candidate, many bits is necessary to encode the intra-prediction mode as described above.

Accordingly, the present invention proposes a method of configuring MPM candidates by extending neighboring blocks used to configure the MPM candidate.

By extending neighboring blocks used to configure an MPM candidate as described above, the probability that the intra-prediction mode of a current block will belong to the MPM candidate can be increased. Furthermore, as a result, encoding efficiency can be improved because the number of bits necessary to encode the intra-prediction mode of a current block can be reduced.

Embodiment 1

Figure 18:
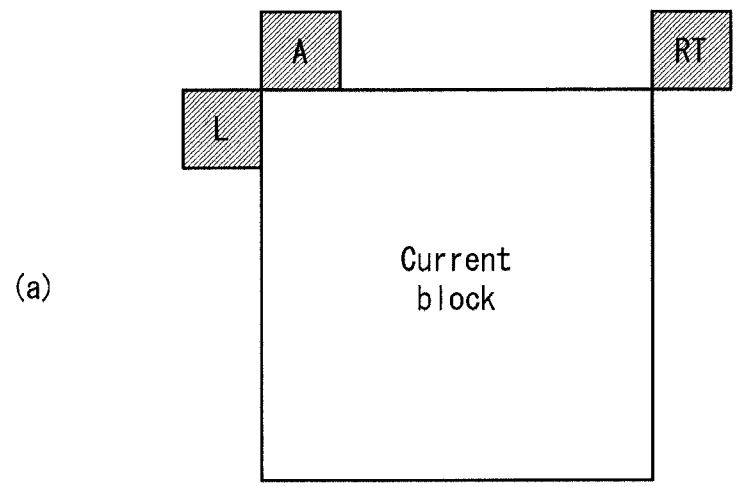
FIG. 18 is a diagram illustrating neighboring blocks for configuring an MPM candidate according to an embodiment of the present invention.
Figure 18:
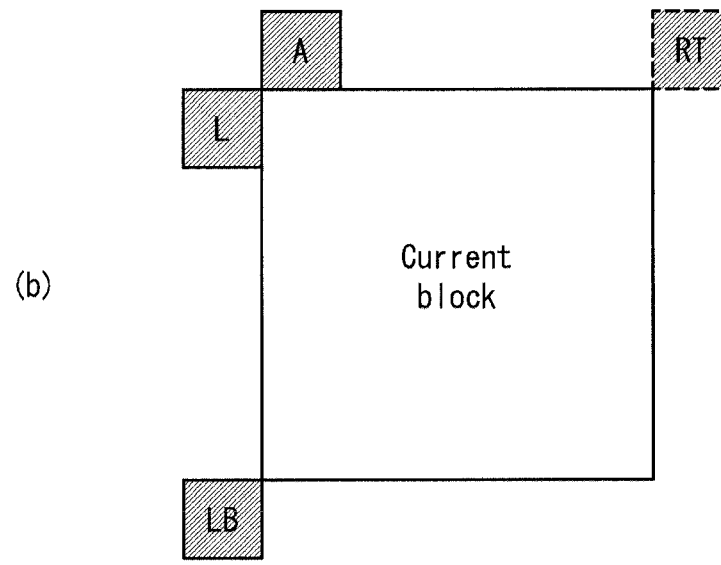

FIG. 18 is a diagram illustrating neighboring blocks for configuring an MPM candidate according to an embodiment of the present invention.

FIG. 18 illustrates a method of using information of the intra-prediction modes of three neighboring blocks when a current block is encoded using neighboring block information to which an intra-prediction mode has been applied.

FIG. 18(a) illustrates a case where intra-prediction mode information of a left neighboring block L, above neighboring block A and top right neighboring block RT is used. FIG. 18(b) illustrates a case where a left neighboring block L, a above neighboring block A and a left bottom neighboring block LB are used.

As in FIG. 18, when the intra-prediction modes of neighboring blocks are derived in order to configure an MPM candidate for a current block, the intra-prediction modes of three neighboring blocks may be derived. Furthermore, the derived intra-prediction modes of the neighboring blocks may be used as the MPM candidate of a current block.

In this case, as in FIG. 18(a), the intra-prediction mode information of the left neighboring block L, above neighboring block A and top right neighboring block RT may be derived and used as the MPM candidate of the current block.

Alternatively, as in FIG. 18(b), the left neighboring block L, the above neighboring block A and the left bottom neighboring block LB may be derived and used as the MPM candidate of the current block.

Furthermore, if the best intra-prediction mode of a current block is one mode of an MPM candidate, the encoder may transmit only an index indicative of a corresponding MPM mode of the MPM candidate without transmitting all the intra-prediction modes of the current block, thereby being capable of reducing the amount of data.

When the intra-prediction modes of neighboring blocks are derived in order to configure an MPM candidate as described above, the MPM candidate may be differently configured depending on whether the intra-prediction modes of the left neighboring block L, the above neighboring block A, and the top right or left bottom neighboring block RT or LB are available and the intra-prediction mode of each neighboring block.

For example, if the intra-prediction mode of the top right neighboring block RT can be derived, as in FIG. 18(a), intra-prediction mode information of the left neighboring block L, the above neighboring block A and the top right neighboring block RT may be used as the MPM candidate of the current block. In contrast, if the intra-prediction mode of the top right neighboring block RT cannot derived, as in FIG. 18(b), the left neighboring block L, the above neighboring block A and the left bottom neighboring block LB may be used as the MPM candidate of the current block.

For another example, if the intra-prediction mode of the left bottom neighboring block LB can be derived, as in FIG. 18(b), the left neighboring block L, the above neighboring block A and the left bottom neighboring block LB may be used as the MPM candidate of the current block. In contrast, if the intra-prediction mode of the left bottom neighboring block LB cannot derived, as in FIG. 18(a), intra-prediction mode information of the left neighboring block L, the above neighboring block A and the top right neighboring block RT may be used as the MPM candidate of the current block.

For yet another example, if all of the intra-prediction modes of the left neighboring block L, the above neighboring block A, the top right neighboring block RT and the left bottom neighboring block LB can be driven, as in FIG. 18(a) or 18(b), intra-prediction mode information of the neighboring blocks may be used as the MPM candidate of the current block. In contrast, if only the intra-prediction modes of some blocks of the left neighboring block L, the above neighboring block A, the top right neighboring block RT and the left bottom neighboring block LB can be driven, intra-prediction mode information of the neighboring blocks that can be driven may be used as the MPM candidate of the current block.

Hereinafter, a method of configuring MPM candidates is described in more detail.

As described above, the configuration of an MPM candidate may be different depending on whether the intra-prediction modes of the left neighboring block L, the above neighboring block A, and the top right or left bottom neighboring block RT or LB are available and the intra-prediction mode of each of the neighboring blocks.

When the MPM candidate is configured, for example, the MPM candidate may be divided into a neighboring block mode Mode_Neighbor, that is, an intra-prediction mode derived from a neighboring block, and a substitute mode Mode_Substitute, that is, a list of intra-prediction modes known to be most selected in general and configured as in Equation 4 below.

$$Mode_{Neighbor} = \{Mode_{Left}, Mode_{Above}, Mode_{RightTop\ or\ LeftBottom}\}$$

$$Mode_{substitute} = \{Plannar, DC, Vertical, Horizontal, 45\ degree, 135\ degree\} \quad \text{[Equation 4]}$$

Referring to Equation 4, the mode Mode_Neighbor of a neighboring block may configured as a left block mode Mode_Left indicative of the intra-prediction mode of a left neighboring block, an above block mode Mode_Above indicative of the intra-prediction mode of a top neighboring block, and a top right block mode Mode_RightTop indicative of the intra-prediction mode of a top right neighboring block or the intra-prediction mode of a left bottom neighboring block indicative of a left bottom block mode Mode_LeftBottom.

The substitute mode Mode_Substitute may configured as a Planar mode, a DC mode, a vertical mode (e.g., No. 26 mode in the case of FIG. 6 or FIG. 12 and No. 28 mode in the case of FIG. 13), a horizontal mode (e.g., No. 10 mode in the case of FIG. 6 or 12, No. 12 mode in the case of FIG. 13), a 45° mode (e.g., No. 34 mode in the case of FIG. 6 or 12, No. 36 mode in the case of FIG. 13), and a 135° mode (e.g., No. 18 mode in the case of FIG. 6 or 12, No. 20 mode in the case of FIG. 13).

In this case, Equation 4 is only one example of intra-prediction modes forming the neighboring block mode Mode_Neighbor and the substitute mode Mode_Substitute, and may configured as the intra-prediction modes in order different from the aforementioned order.

The neighboring block mode Mode_Neighbor may be first input to the MPM candidate. In this case, if an intra-prediction mode cannot be derived at the location of a neighboring block for configuring the MPM candidate, the elements of the substitute mode Mode_Substitute may be sequentially input to configure the MPM candidate.

For example, if the left block mode Mode_Left is present, but the above block mode Mode_Above and the top right block mode Mode_RightTop are not present, the Planar and DC modes may be substituted in the MPM candidate.

If all the left block mode Mode_Left, the above block mode Mode_Above and the top right block mode Mode_RightTop (or left bottom block mode Mode_LeftBottom) are available, an MPM candidate for a current block may be included using the following method.

1) if the left block mode Mode_Left, the above block mode Mode_Above and the top right block mode Mode_RightTop (or left bottom block mode Mode_LeftBottom) are different (i.e., ModeLeft!=ModeAbove!=ModeRightTop (or LeftBottom)).

In this case, the MPM candidate may be configured in order of the elements of a neighboring block mode Mode_Neighbor. For example, as in the example of Equation 4, the MPM candidate may sequentially include the left block mode Mode_Left, the above block mode Mode_Above, and the top right block mode Mode_RightTop (or left bottom block mode Mode_LeftBottom).

In this case, if the total number of MPM candidates is greater than 3, as described above, the elements of the neighboring block mode Mode_Neighbor are sequentially input to the MPM candidate, and the elements of the substitute mode Mode_Substitute may be sequentially filled until the total number of MPM candidates are satisfied.

In this case, if there is an overlapped intra-prediction mode, a next element may be input to the MPM candidates. That is, the MPM candidates may be configured so that intra-prediction modes forming the MPM candidates do not overlap.

For example, if any one of the left block mode Mode_Left, the above block mode Mode_Above and the top right block mode Mode_RightTop (or left bottom block mode Mode_LeftBottom) is a planar mode, the elements of the three neighboring block mode Mode_Neighbor may be sequentially input to the MPM candidate and modes from the DC mode other than the Planar mode may be sequentially input to the MPM candidate.

2) if the left block mode Mode_Left is the same as the above block mode Mode_Above, but is different from the top right block mode Mode_RightTop (or left bottom block mode Mode_LeftBottom) (i.e., ModeLeft==ModeAbove!=ModeRightTop (or LeftBottom))

2-1) if the left block mode Mode_Left and the top right block mode Mode_RightTop (or left bottom block mode Mode_LeftBottom) are directional modes In this case, the left block mode Mode_Left and the top right block mode Mode_RightTop (or left bottom block mode Mode_LeftBottom) may be first input to the MPM candidate. Furthermore, the two neighboring directional modes (e.g., if the left block mode Mode_Left is No. 20 mode, No. 19 mode and No. 21 mode) of the left block mode Mode_Left may be input to the MPM candidate.

If the number of MPM candidates has not been fully filled, the two neighboring directional modes of the top right block mode Mode_RightTop (or left bottom block mode Mode_LeftBottom) may be input to the MPM candidate.

Furthermore, if the number of MPM candidates has not been fully filled, the elements of the substitute mode Mode_Substitute may be sequentially filled until a total number of MPM candidates are satisfied.

In this case, if the mode overlaps a mode already inputted to the MPM candidate, the overlapped mode may not be input to the MPM candidate. That is, the MPM candidate may be configured so that modes forming the MPM candidate do not overlap.

2-2) if the left block mode Mode_Left or the top right block mode Mode_RightTop (or left bottom block mode Mode_LeftBottom) is a directional mode First, the left block mode Mode_Left and the top right block mode Mode_RightTop (or left bottom block mode Mode_LeftBottom) may be input to the MPM candidate. Furthermore, if the two neighboring directional modes (e.g., in the case of No. 20 mode, No. 19 mode and No. 21 mode) of a directional mode may be input to the MPM candidate.

Furthermore, if the number of MPM candidates has not been fully filled, the elements of the substitute mode Mode_Substitute may be sequentially filled until the total number of MPM candidates are satisfied.

In this case, if the mode overlaps a mode already inputted to the MPM candidate, the overlapped mode may not be input to the MPM candidate. That is, the MPM candidate may be configured so that modes forming the MPM candidate do not overlap.

2-3) if the left block mode Mode_Left and the top right block mode Mode_RightTop (or left bottom block mode Mode_LeftBottom) are non-directional modes (e.g., Planar mode or DC mode)

First, the left block mode Mode_Left and the top right block mode Mode_RightTop (or left bottom block mode Mode_LeftBottom) may be first input to the MPM candidate. Furthermore, the elements of the substitute mode Mode_Substitute may be sequentially input to the MPM candidate.

In this case, if the mode overlaps a mode already inputted to the MPM candidate, the overlapped mode may not be input to the MPM candidate. That is, the MPM candidate may be configured so that modes forming the MPM candidate do not overlap.

3) if the left block mode Mode_Left is different from the above block mode Mode_Above, but is the same as the top right block mode Mode_RightTop (or left bottom block mode Mode_LeftBottom) (i.e., ModeLeft!=ModeAbove==ModeRightTop (or LeftBottom))

3-1) if the left block mode Mode_Left and the above block mode Mode_Above are directional modes First, the left block mode Mode_Left and the above block mode Mode_Above may be input to the MPM candidate. Furthermore, the two neighboring directional modes (e.g., if the left block mode Mode_Left is No. 20 mode, No. 19 mode and No. 21 mode) of the left block mode Mode_Left may be input to the MPM candidate.

If the number of MPM candidates has not been fully filled, the two neighboring directional modes of the above block mode Mode_Above may be input to the MPM candidate.

Furthermore, if the number of MPM candidates has not been fully filled, the elements of the substitute mode Mode_Substitute may be sequentially filled until the total number of MPM candidates are satisfied.

In this case, if the mode overlaps a mode already inputted to the MPM candidate, the overlapped mode may not be input to the MPM candidate. That is, the MPM candidate may be configured so that modes forming the MPM candidate do not overlap.

3-2) if the left block mode Mode_Left or the above block mode Mode_Above is a directional mode First, the left block mode Mode_Left and the above block mode Mode_Above may be input to the MPM candidate. Furthermore, the two neighboring directional modes (e.g., in the case of No. 20 mode, No. 19 mode and No. 21 mode) of one of the two directional modes may be input to the MPM candidate.

Furthermore, if the number of MPM candidates has not been fully filled, the elements of the substitute mode Mode_Substitute may be sequentially filled until the total number of MPM candidates are satisfied.

In this case, if the mode overlaps a mode already inputted to the MPM candidate, the overlapped mode may not be input to the MPM candidate. That is, the MPM candidate may be configured so that modes forming the MPM candidate do not overlap.

3-3) if the left block mode Mode_Left and the above block mode Mode_Above are non-directional modes (e.g., Planar mode or DC mode)

First, the left block mode Mode_Left and the above block mode Mode_Above may be input to the MPM candidate. Furthermore, the elements of the substitute mode Mode_Substitute may be sequentially to the MPM candidate.

In this case, if the mode overlaps a mode already inputted to the MPM candidate, the overlapped mode may not be input to the MPM candidate. That is, the MPM candidate may be configured so that modes forming the MPM candidate do not overlap.

4) if all the left block mode Mode_Left and the above block mode Mode_Above and the top right block mode Mode_RightTop (or left bottom block mode Mode_LeftBottom) are the same (i.e., ModeLeft==ModeAbove==ModeRightTop (or LeftBottom))

4-1) if the left block mode Mode_Left is a directional mode

First, the left block mode Mode_Left may be input to the MPM candidate. Furthermore, the two neighboring directional modes (e.g., if the left block mode Mode_Left is No. 20 mode, No. 19 mode and No. 21 mode) of the left block mode Mode_Left may be input to the MPM candidate.

If the number of MPM candidates has not been fully filled, the elements of the substitute mode Mode_Substitute may be sequentially filled until the total number of MPM candidates are satisfied.

In this case, if the mode overlaps a mode already inputted to the MPM candidate, the overlapped mode may not be input to the MPM candidate. That is, the MPM candidate may be configured so that modes forming the MPM candidate do not overlap.

4-2) if the left block mode Mode_Left is a non-directional mode (e.g., Planar mode or DC mode)

First, the left block mode Mode_Left may be input to the MPM candidate. Furthermore, the elements of the substitute mode Mode_Substitute may be sequentially input to the MPM candidate.

In this case, if the mode overlaps a mode already inputted to the MPM candidate, the overlapped mode may not be input to the MPM candidate. That is, the MPM candidate may be configured so that modes forming the MPM candidate do not overlap.

If an MPM candidate is configured using the aforementioned method, the intra-prediction mode of a surrounding block having a good possibility that the intra-prediction mode of a current block will be hit and intra-prediction modes that are commonly most selected may be secured as many MPM candidates. Accordingly, an intra-prediction mode can be represented (or specified) using the amount of bits smaller than the amount of bits necessary when an intra-prediction mode number is encoded without any change.

In the aforementioned MPM configuration method, a maximum number of MPM candidates may be 6 because all the elements of the neighboring block mode Mode_Neighbor and the substitute mode Mode_Substitute are included as an MPM candidate. This is for convenience of description, and the present invention is not limited thereto. For example, the number of MPM candidates may be extended as the number of elements of a neighboring block mode Mode_Neighbor and/or a substitute mode Mode_Substitute increases.

Figure 19:
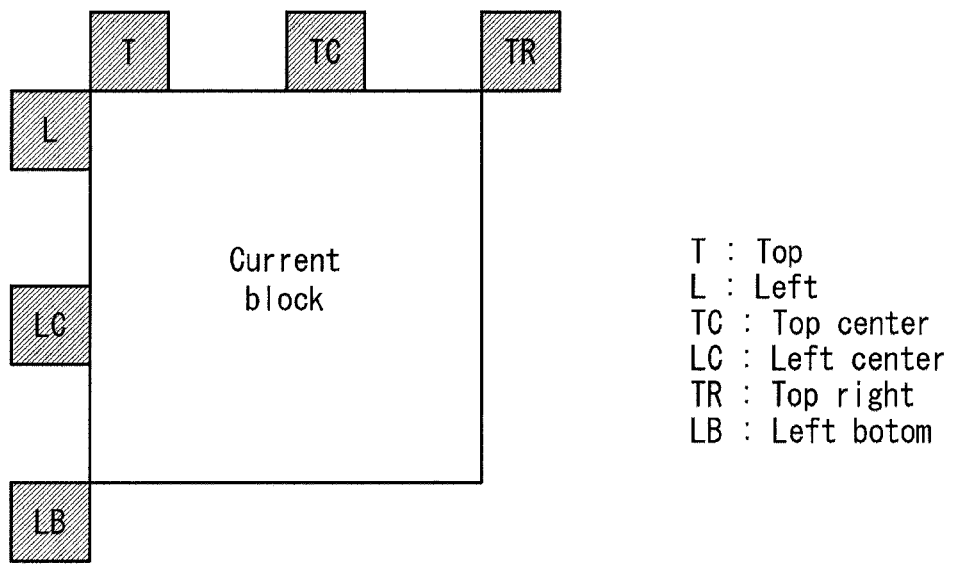
FIG. 19 is a diagram illustrating neighboring blocks for configuring an MPM candidate according to an embodiment of the present invention.

FIG. 19 is a diagram illustrating neighboring blocks for configuring an MPM candidate according to an embodiment of the present invention.

FIG. 19 illustrates a method using information of the intra-prediction modes of six neighboring blocks if a current block is to be coded using neighboring block information to which an intra-prediction mode has been applied.

FIG. 19 illustrates a case where intra-prediction mode information of a left neighboring block L, a top neighboring block T, a top center neighboring block TC, a top right neighboring block TR, a left center neighboring block LC and a left bottom neighboring block LB are used.

For example, if the top neighboring block of a current block is split into N×2N, the left block of the top neighboring block may correspond to the top neighboring block T and the right block of the top neighboring block may correspond to the top center neighboring block TC.

Likewise, if the left neighboring block of the current block is split into 2N×N, the top block of the left neighboring block may correspond to the left neighboring block L and the bottom block of the left neighboring block may correspond to the left center neighboring block LC.

In order to configure an MPM candidate for a current block as in FIG. 19, when the intra-prediction modes of neighboring blocks are derived, the intra-prediction modes of six neighboring blocks may be derived. Furthermore, the intra-prediction modes of the neighboring blocks may be derived and used as the MPM candidate of the current block. Furthermore, the derived intra-prediction modes of the neighboring blocks may be used as the MPM candidate of the current block.

Furthermore, a neighboring block candidate group may be include a plurality of neighboring blocks available for configuring (or generating) the MPM candidate of a current block. In the case of the example of FIG. 19, a neighboring block candidate group may include the left neighboring block L, the top neighboring block T, the top center neighboring block TC, the top right neighboring block TR, the left center neighboring block LC and the left bottom neighboring block LB. In this case, the encoder/decoder may select neighboring blocks used to configure the MPM candidate of the current block so that the same intra-prediction modes do not overlap except a block from an intra-prediction mode cannot be derived within the neighboring block candidate group. Furthermore, an MPM candidate may be configured using the intra-prediction modes of the selected neighboring blocks.

Furthermore, if the best intra-prediction mode of the current block is one of MPM candidates, the encoder can transmit only an index indicative of a corresponding MPM mode of the MPM candidate without transmitting all of the intra-prediction modes of the current block, thereby being capable of reducing the amount of data.

When the intra-prediction modes of neighboring blocks are derived to configure an MPM candidate as described above, the MPM candidate may be differently configured depending on whether the intra-prediction modes of the left neighboring block L, the top neighboring block T, the top center neighboring block TC, the top right neighboring block TR, the left center neighboring block LC and the left bottom neighboring block LB are available and the intra-prediction mode of each neighboring block.

For example, if all of the intra-prediction modes of the left neighboring block L, the top neighboring block T, the top center neighboring block TC, the top right neighboring block TR, the left center neighboring block LC and the left bottom neighboring block LB can be derived, as in FIG. 19, intra-prediction mode information of the neighboring blocks may be used as the MPM candidate of a current block. In contrast, if only the intra-prediction modes of some blocks of the left neighboring block L, the above neighboring block A, the top right neighboring block RT and the left bottom neighboring block LB can be derived, intra-prediction mode information of the neighboring blocks that can be derived may be used as the MPM candidate of a current block.

When an MPM candidate is configured, for example, the MPM candidate may be divided into a neighboring block mode Mode_Neighbor, that is, an intra-prediction mode that may be derived from a neighboring block, and a substitute mode Mode_Substitute, that is, a list of intra-prediction modes known to be commonly most selected, as in Equation 5.

$$\text{Mode}_{Neighbor} = \qquad \text{[Equation 5]}$$
$$\{\text{Mode}_{Left}, \text{Mode}_{Top}, \text{Mode}_{RightTop}, \text{Mode}_{LeftBottom}, \ldots\}$$
$$\text{Mode}_{Substitute} = \{\text{Plannar}, DC, \text{Vertical},$$
$$\text{Horizontal}, 45 \text{ degree}, 135 \text{ degree}, \text{Mode}_{Left} - 1,$$
$$\text{Mode}_{Left} + 1, \text{Mode}_{Top} - 1, \text{Mode}_{Top} + 1 \ldots\}$$

Referring to Equation 5, the neighboring block mode Mode_Neighbor may include a left block mode Mode_Left indicative of the intra-prediction mode of a left neighboring block, a top block mode Mode_Top indicative of the intra-prediction mode of a top neighboring block, a top right block mode Mode_RightTop indicative of the intra-prediction mode of a top right neighboring block, and a left bottom block mode Mode_LeftBottom indicative of the intra-prediction mode of a left bottom neighboring block. In addition to the aforementioned block modes, the neighboring block mode Mode_Neighbor may include top center block mode Mode_TopCenter indicative of the intra-prediction mode of a top center neighboring block and a left center block mode Mode_LeftCenter indicative of the intra-prediction mode of a left center neighboring block.

Furthermore, the substitute mode Mode_Neighbor may include a Planar mode, a DC mode, a vertical mode (e.g., No. 26 mode in the case of FIG. 6 or 12, No. 28 mode in the case of FIG. 13), a 45° mode (e.g., No. 34 mode in the case of FIG. 6 or 12, No. 36 mode in the case of FIG. 13), a 135° mode (e.g., No. 18 mode in the case of FIG. 6 or 12, No. 20 mode in the case of FIG. 13), a mode Mode_Left−1 neighboring the left of a left block mode, a mode Mode_Left+1 neighboring the right of the left block mode, a mode Mode_Above−1 neighboring the left of a top block mode, and a mode Mode_Above+1 neighboring the right of the top block mode.

In this case, Equation 5 is only one example of intra-prediction modes forming the neighboring block mode Mode_Neighbor and the substitute mode Mode_Substitute, and the intra-prediction modes may have order different from the aforementioned order.

The neighboring block mode Mode_Neighbor may be first input to an MPM candidate.

In this case, if an intra-prediction mode cannot be derived at the location of a neighboring block for configuring the MPM candidate, the elements of the substitute mode Mode_Substitute may be sequentially input to configure the MPM candidate. For example, if the left block mode Mode_Left is present, but the top block mode Mode_Top and the top right block mode Mode_RightTop are not available, they may be substituted with the Planar and DC modes, respectively.

Furthermore, if the neighboring block modes Mode_Neighbor of surrounding blocks are the same (i.e., if an overlapped intra-prediction mode is present) and thus a predetermined number of MPMs cannot be filled, the MPM candidate may be configured by filling it with elements that belong to the elements of the substitute mode Mode_Substitute and that do not overlap current MPM candidates according to a predetermined sequence.

If an MPM candidate is configured using the aforementioned method, many MPM candidates including the intra-prediction mode of a surrounding block having a good possibility that the intra-prediction mode of a current block will be hit and intra-prediction modes that are commonly most selected can be secured. Accordingly, an intra-prediction mode can be represented (or specified) using the amount of bits smaller than the amount of bits necessary when an intra-prediction mode number is coded without any change.

Embodiment 2

For efficient intra-frame prediction mode encoding, the statistical characteristics of a prediction mode are used. In general, videos have similar characteristics for each region, and thus the prediction mode of a block to be now encoded and the prediction mode of a block neighboring a current block have similar characteristics. That is, the prediction mode of the current block has a high probability that it will be the same as or similar to the prediction mode of a neighboring block. A most probable mode (MPM) is generated using the modes of neighboring PU blocks by taking into consideration the characteristics, and intra-frame prediction mode encoding is efficiently performed.

The present invention proposes a method of extending the number of MPM candidates to 4 or 5 and generating an MPM candidate.

In general, a video includes many vertical or horizontal characteristics. Accordingly, in the case of a prediction mode direction, prediction modes are densely generated near the vertical or horizontal direction and are coarsely generated as they become distant from the vertical or horizontal direction.

An MPM candidate may be determined based on priority of a prediction mode direction by taking into consideration such a characteristic.

Figure 20:
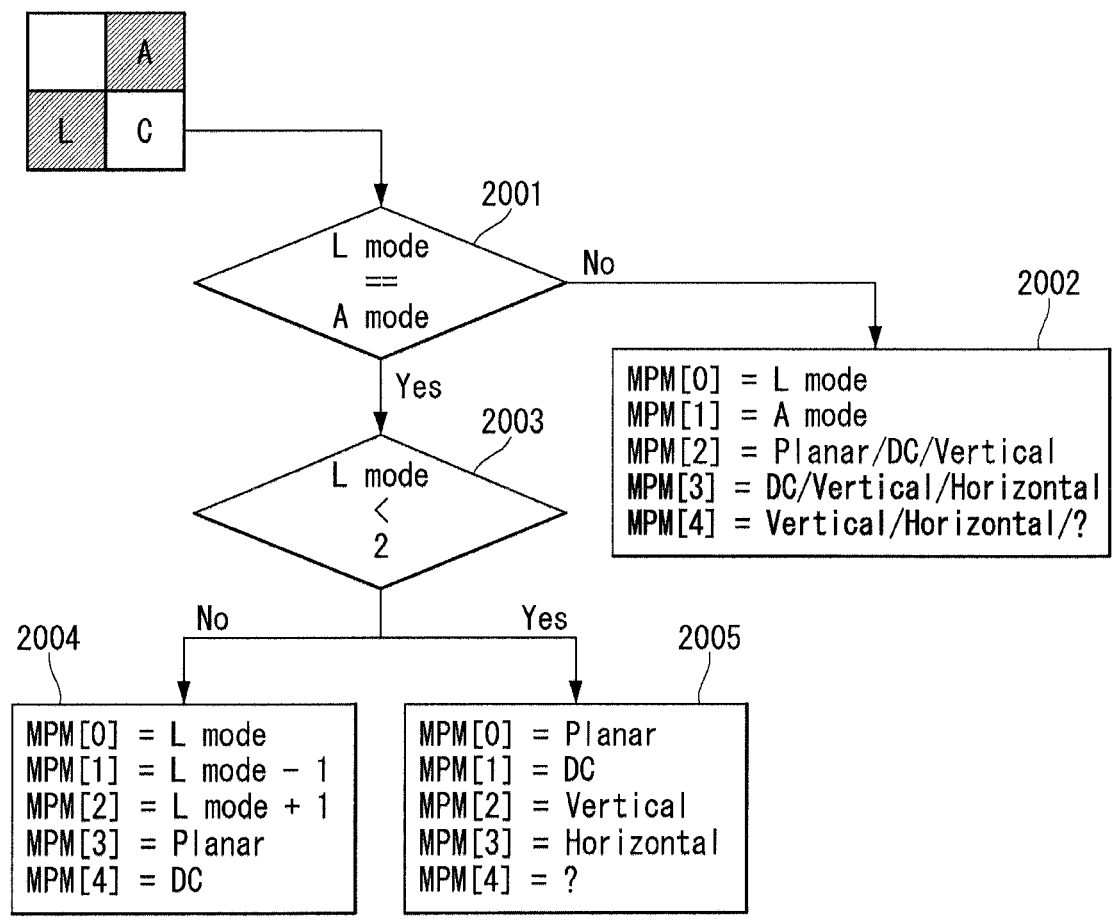
FIG. 20 illustrates a method of configuring MPM candidates according to an embodiment of the present invention.

FIG. 20 illustrates a method of configuring MPM candidates according to an embodiment of the present invention.

FIG. 20 shows an MPM generation process of increasing the number of MPM candidates to 5. If the number of MPM candidates has been defined as 5 as described above, MPM candidates from an MPM[0] to an MPM[4] may be determined.

If the number of MPM candidates has been defined as 4, MPM candidates from the MPM[0] to the MPM[3] may be determined. In FIG. 20, the MPM[4] may not be included in the MPM candidates.

In FIG. 20, 'C' indicates a current block, 'A' indicates the top neighboring block of the current block, and 'L' indicates the left neighboring block of the current block.

Referring to FIG. 20, the encoder/decoder determines whether the intra-prediction mode (L mode) of the left neighboring block of the current block is the same as the intra-prediction mode (A mode) of the top neighboring block (i.e., L mode=A mode) (S2001).

If, as a result of the determination at step S2001, the L mode and the A mode are not the same, the encoder/decoder configures MPM candidates using the following method (S2002).

If the number of MPM candidates is 4, the L mode may be input to the MPM[0], the A mode may be input to the MPM[1], any one of the Planar mode, the DC mode and the vertical mode (e.g., No. 26 mode in the case of FIG. 6 or 12, No. 28 mode in the case of FIG. 13) may be input to the MPM[2], and any one of the DC mode, the Planar mode and the horizontal mode (e.g., No. 10 mode in the case of FIG. 6 or 12, No. 12 mode in the case of FIG. 13) may be input to the MPM[3].

If the number of MPM candidates is 5, the L mode may be input to the MPM[0], the A mode may be input to the MPM[1], any one of the Planar mode, the DC mode and the vertical mode (e.g., No. 26 mode in the case of FIG. 6 or 12, No. 28 mode in the case of FIG. 13) may be input to the MPM[2], any one of the DC mode, the vertical mode (e.g., No. 26 mode in the case of FIG. 6 or 12, No. 28 mode in the case of FIG. 13) and the horizontal mode (e.g., No. 10 mode in the case of FIG. 6 or 12, No. 12 mode in the case of FIG. 13) may be input to the MPM[3], and any one of the vertical mode (e.g., No. 26 mode in the case of FIG. 6 or 12, No. 28 mode in the case of FIG. 13), the horizontal mode (e.g., No. 10 mode in the case of FIG. 6 or 12, No. 12 mode in the case of FIG. 13) and a specific mode (? mode) may be input to the MPM[4].

In this case, the specific mode (? mode) may correspond to a specific mode other than the aforementioned Planar mode, DC mode, vertical mode and horizontal mode.

This is described in more detail. If the number of MPM candidates is 4 and 5, an MPM is determined using a method, such as Table 2 below.

In this case, if the number of MPM candidates is 4 and MPM candidates are determined to be 4, the following MPM candidate determination process is terminated if the number of MPM candidates is 5 and MPM candidates are determined to be 5.

Table 2 illustrates a method of configuring an MPM candidate.

TABLE 2

MPM[0] = L mode
MPM[1] = A mode
NumMode = 2
if (L mode != Planar && A mode != Planar)
   MPM[NumMode++] = Planar
if (L mode != DC && A mode != DC)
   MPM[NumMode++] = DC
if (L mode != Vertical && A mode != Vertical)
   MPM[NumMode++] = Vertical
if (L mode != Horizontal && A mode != Horizontal)
   MPM[NumMode++]= Horizontal
if (L mode != ? && A mode != ?)
   MPM[NumMode++] = ?

Referring to Table 2, first, the L mode may be input to the MPM[0] and the A mode may be input to the MPM[1]. Furthermore, 2 may be input to NumMode.

In Table 2, NumMode++ means that a value, that is, the sum of 1 to NumMode, is input to NumMode. That is, MPM[NumMode++]=xx means that the NumMode value is increased by 1 after an xx intra-prediction mode is set in MPM[NumMode].

(1) If the L mode is not the Planar mode and the A mode is not the Planar mode (i.e., if (L mode !=Planar && A mode !=Planar) is true), the Planar mode may be input to the MPM[2] (NumMode=2). Furthermore, the NumMode value may be increased by 1.

(2) If the L mode is not the DC mode and the A mode is not the DC mode (i.e., if (L mode !=DC && A mode !=DC) is true), the DC mode is input to the MPM[2] (if (1) is false, NumMode=2) or the DC mode may be input to the MPM[3] (if (1) is true, NumMode=3). Furthermore, the NumMode value may be increased by 1.

(3) If the L mode is not the vertical mode and the A mode is not the vertical mode (i.e., if (L mode !=Vertical && the A mode Vertical) is true), the vertical mode is input to the MPM[2] or (if both (1) and (2) are false, NumMode=2). If the vertical mode is input to the MPM[3] (if any one of (1) and (2) is true, NumMode=3), the vertical mode may be input to the MPM[4] (if both (1) and (2) are true, NumMode=4). Furthermore, the NumMode value may be increased by 1.

(4) If the L mode is not the horizontal mode and the A mode is not the horizontal mode (i.e., (if L mode !=Horizontal && A mode !=Horizontal) is true), the horizontal mode may be input to the MPM[3] (if any one of (1) to (3) is true, NumMode=3) or the horizontal mode may be input to the MPM[4] (if only two of (1) to (3) are true, NumMode=4). Furthermore, the NumMode value may be increased by 1.

(5) if the L mode is not a specific mode (? mode) and the A mode is not a specific mode (? mode) (i.e., if (L mode !=? && A mode !=?) is true), the specific mode (? mode) may be input to the MPM[4] (if any two of (1) to (4) are true, NumMode=4). Furthermore, the NumMode value may be increased by 1.

If, as a result of the determination at step S2001, the L mode and the A mode are the same, the encoder/decoder determines whether the L mode is smaller than 2 (i.e., the L mode<2, for example, refer to the Planar mode and DC mode, Table 1 and FIG. 12 or 13) (S2003).

If, as a result of the determination at step S2003, the L mode is identical with or greater than 2, the encoder/decoder configures MPM candidates using the following method (S2004).

If the number of MPM candidates is 4, the L mode may be input to the MPM[0], an L−1 mode (e.g., if the L mode is No. 20 mode, No. 19 mode) may be input to the MPM[1], and an L+1 mode (e.g., if the L mode is No. 20 mode, No. 21 mode) may be input to the MPM[2], and the Planar mode may be input to the MPM[3].

If the number of MPM candidates is 5, the L mode may be input to the MPM[0], an L−1 mode (e.g., if the L mode is No. 20 mode, No. 19 mode) may be input to the MPM[1], an L+1 mode (e.g., if the L mode is No. 20 mode, No. 21 mode) may be input to the MPM[2], the Planar mode may be input to the MPM[3], and the DC mode may be input to the MPM[4].

In contrast, if, as a result of the determination at step S2003, the L mode is smaller than 2, the encoder/decoder configures MPM candidates using the following method (S2005).

If the number of MPM candidates is 4, the Planar mode may be input to the MPM[0], the DC mode may be input to the MPM[1], the vertical mode (e.g., No. 26 mode in the case of FIG. 6 or 12, No. 28 mode in the case of FIG. 13) may be input to the MPM[2], and the horizontal mode (e.g., No. 10 mode in the case of FIG. 6 or 12, No. 12 mode in the case of FIG. 13) may be input to the MPM[3].

If the number of MPM candidates is 5, the Planar mode may be input to the MPM[0], the DC mode may be input to the MPM[1], the vertical mode (e.g., No. 26 mode in the case of FIG. 6 or 12, No. 28 mode in the case of FIG. 13) may be input to the MPM[2], the horizontal mode (e.g., No. 10 mode in the case of FIG. 6 or 12, No. 12 mode in the case of FIG. 13) may be input to the MPM[3], and a specific mode (? mode) may be input to the MPM[4].

In this case, the specific mode (? mode) may correspond to a specific mode other than the Planar mode, the DC mode, the vertical mode and the horizontal mode.

The embodiment of FIG. 20 illustrates a case where the number of MPM candidates is determined to be 4 or 5, but the present invention is not limited thereto.

That is, N MPM candidates may be determined. By way of example, if the number of intra-frame prediction modes is greater than the number of intra-frame prediction modes used now, the number of MPM candidates may be inevitably increased.

The most important factor in a method of determining an MPM candidate is to determine an intra-prediction mode having high frequency of occurrence to be an MPM candidate. Accordingly, in the embodiment of FIG. 20, a mode having high frequency of occurrence mode compared to other modes, such as the Planar mode, the DC mode, the horizontal mode and the vertical mode, is determined to be an MPM candidate mode for this reason.

Accordingly, likewise, if N MPM candidates are used, in determining the N MPM candidates, N modes having high frequency of occurrence may be selected and determined as an MPM candidate. This is described with reference to the following drawing.

Figure 21:
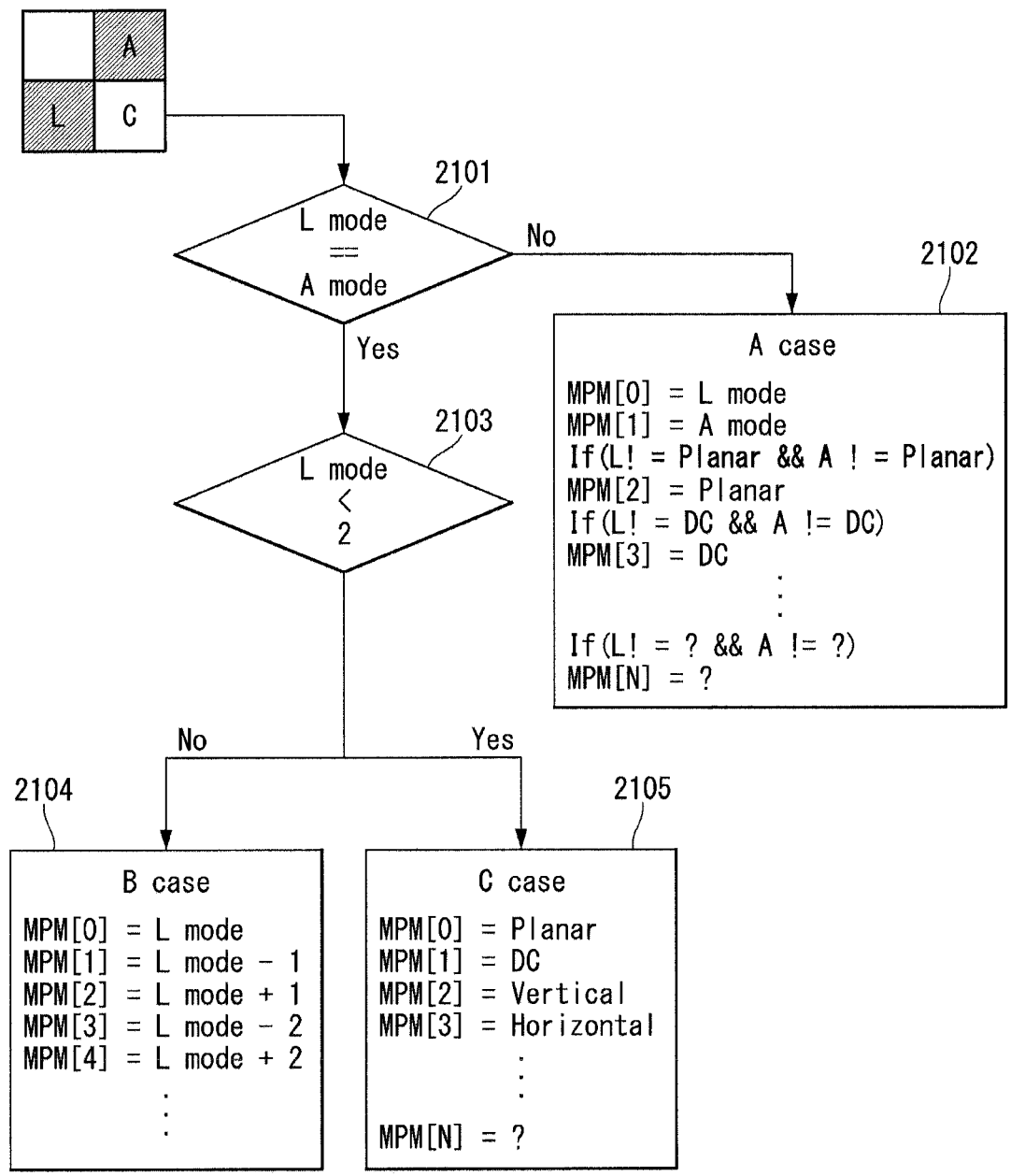
FIG. 21 illustrates a method of configuring MPM candidates according to an embodiment of the present invention.

FIG. 21 illustrates a method of configuring MPM candidates according to an embodiment of the present invention.

FIG. 21 illustrates a method of configuring N MPM candidates.

In order to configure the N MPM candidates, the encoder/decoder may first select N modes according to frequency that an intra-frame prediction mode is generated and assign priority to the N modes (i.e., the substitute mode Mode_Substitute).

In this case, the encoder may signal information about previously selected N intra-prediction modes (i.e., information about substitute modes) to the decoder based on the priority.

Furthermore, the encode may generate an MPM candidate by comparing the selected N modes based on the priority.

Hereinafter, it is assumed that seven MPM candidates are used and N modes determined based on priority are {Planar, DC, Vertical, Horizontal, 2, 34, 18}, for convenience of description, but the present invention is not limited thereto. That is, although the number of MPM candidates is N, MPM candidate may be configured using the same method.

In FIG. 21, 'C' indicates a current block, 'A' indicates the top neighboring block of the current block, and 'L' indicates the left neighboring block of the current block.

Referring to FIG. 21, the encoder/decoder determines whether the intra-prediction mode (L mode) of the left neighboring block of the current block is identical with the intra-prediction mode (A mode) of the top neighboring block (i.e., L mode==A mode) (S2101).

If, as a result of the determination at step S2101, if the L mode and the A mode are not the same, the encoder/decoder configures MPM candidates using the following method (S2102).

First, the L mode may be input to an MPM[0] and the A mode may be input to an MPM[1]. Furthermore, after N modes determined based on priority are compared with the L mode and the A mode, if the N modes are not the same as the L mode and the A mode, the N modes may be sequentially input to the MPM candidates. N MPMs may be generated using such a method.

That is, in accordance with the above assumption, {Planar, DC, Vertical, Horizontal, 2, 34, 18} are sequentially compared with the L mode and the A mode. Accordingly, if the Planar mode is not identical with both the L mode and the A mode (i.e., if (L !=Planar && A !=Planar) is true), the Planar mode is input to an MPM[2]. Furthermore, if the DC mode is not the same as both the L mode and the A mode (i.e., if (L !=DC && A !=DC) is true), the DC mode is input to an MPM[3]. As described above, the N modes determined based on priority (i.e., a substitute mode Mode_Substitute) are compared with the L mode and the A mode. If the N modes are not the same as the L mode and the A mode, the N modes are sequentially input to the MPM candidates.

If, as a result of the determination at step S2101, the L mode and the A mode are the same, the encoder/decoder determines whether the L mode is smaller than 2 (i.e., L mode<2, for example, refer to the Planar mode and the DC mode, Table 1, and FIG. 12 or 13) (S2103).

If, as a result of the determination at step S2103, the L mode is identical with or greater than 2, the encoder/decoder configures MPM candidates using the following method (S2104).

In this case, the L mode may be input to an MPM[0], an L−1 mode (e.g., if the L mode is No. 20 mode, No. 19 mode) may be input to an MPM[1], an L+1 mode (e.g., if the L mode is No. 20 mode, No. 21 mode) may be input to an MPM[2], an L−2 mode (e.g., if the L mode is No. 20 mode, No. 18 mode) may be input to an MPM[3], an L+2 mode (e.g., if the L mode is No. 20 mode, No. 22 mode) may be input to an MPM[4], and N MPM candidates may be generated using the same sequence/pattern.

If, as a result of the determination at step S2103, the L mode is smaller than 2, the encoder/decoder configures MPM candidates using the following method (S2105).

In this case, the MPM candidates may be generated by sequentially inputting the N modes determined based on priority (i.e., the substitute mode) to the MPM candidates. That is, in accordance with the above assumption, the MPM candidates may be generated in order of {Planar, DC, Vertical, Horizontal, 2, 34, 18}.

Embodiment 3

In the case of current HEVC, two neighboring blocks (the left neighboring block L and the above neighboring block A) of a block (e.g., PU) neighboring a current block are used for an MPM determination. Furthermore, in the previous embodiment 2, there was proposed a method of determining N MPM candidates using two neighboring blocks (the left neighboring block and the top neighboring block).

The present embodiment proposes a method of determining MPM candidates using a block that belongs to various surrounding blocks or other pictures of the current block and that corresponds to the current block.

Figure 22:
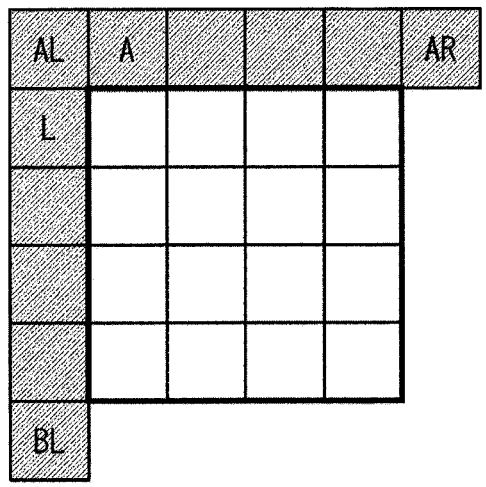
FIG. 22 is a diagram illustrating neighboring blocks used to configure an MPM candidate according to an embodiment of the present invention.

FIG. 22 is a diagram illustrating neighboring blocks used to configure an MPM candidate according to an embodiment of the present invention.

FIG. 22 illustrates a left neighboring block L, a above neighboring block A, an above left neighboring block AL, an above right neighboring block AR, and a left bottom neighboring block BL, that is, neighboring block available for configuring the MPM candidates of a current block. MPM candidates for a current block may be determined using the three or four of the five neighboring blocks or MPM candidates for a current block may be determined using all the five neighboring blocks. In this case, the three or four neighboring blocks may be selected in various combinations.

As described above, the present embodiment in which various neighboring blocks of a current block are used may be used in combination with the aforementioned embodiment 2. That is, four or five or N MPM candidates may be determined using various surrounding or neighboring blocks.

Figure 23:
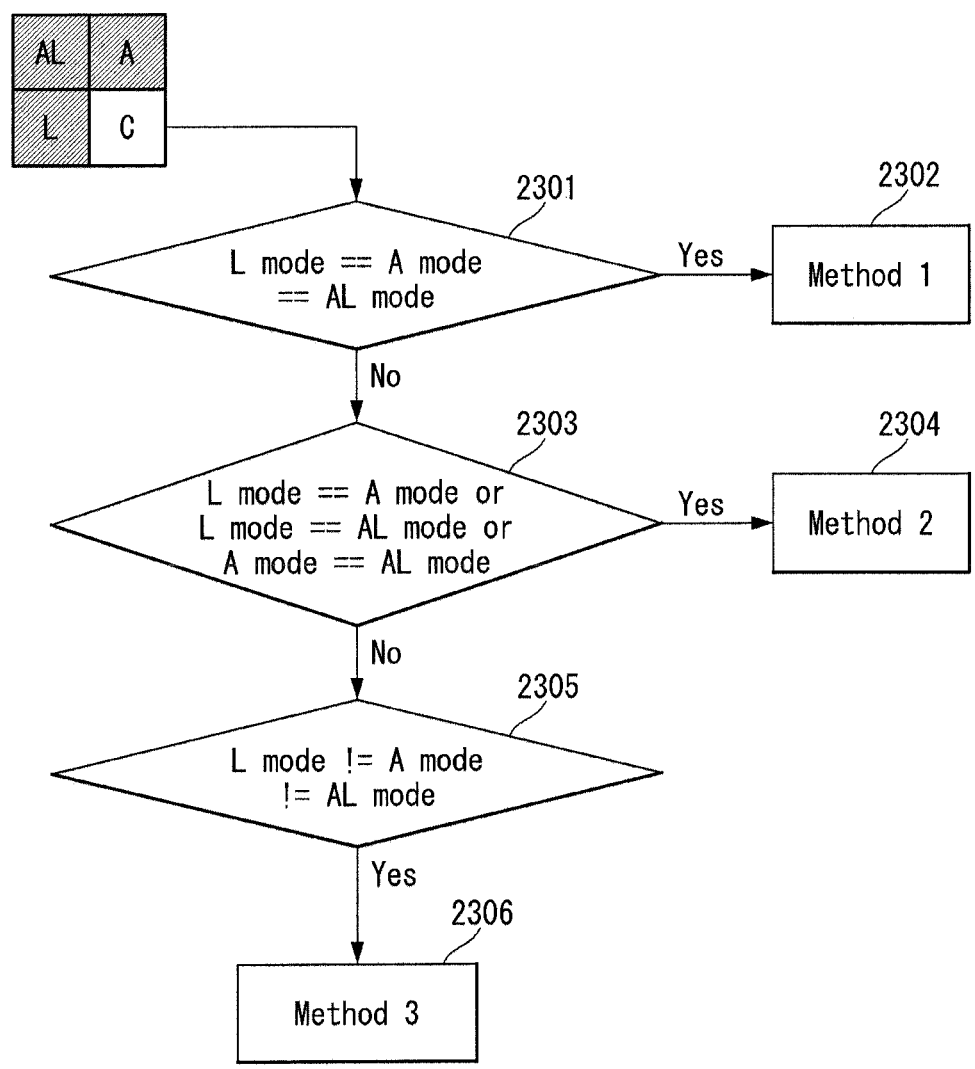
FIG. 23 illustrates a method of configuring MPM candidates according to an embodiment of the present invention.

FIG. 23 illustrates a method of configuring MPM candidates according to an embodiment of the present invention.

In FIG. 23, 'C' includes a current block, 'A' indicates the top neighboring block of the current block, 'L' indicates the left neighboring block of the current block, and 'AL' indicates the top left neighboring block of the current block.

FIG. 23 illustrates a method of generating five MPM candidates using the three neighboring blocks of the left neighboring block L, the above neighboring block A and the above left neighboring block AL in FIG. 22, but the present invention is not limited thereto as described above.

Referring to FIG. 23, the encoder/decoder determines whether all of the intra-prediction mode (L mode) of the left neighboring block of the current block, the intra-prediction mode (A mode) of the top neighboring block of the current block and the intra-prediction mode (AL mode) of the above left neighboring block of the current block are the same (i.e., L mode==A mode==AL mode) (S2301).

If, as a result of the determination at step S2301, all of the L mode, the A mode and the AL mode are the same, the encoder/decoder configures MPM candidates according to the following method 1 (S2302).

Table 3 illustrates a method (Method 1) of configuring MPM candidates if all of the L mode, the A mode and the AL mode are the same.

TABLE 3

| Method 1 (L == A == AL) |
|---|
| if (L > 2)<br>    MPM[0] = L<br>    MPM[1] = L−1<br>    MPM[2] = L+1<br>    MPM[3] = Planar<br>    MPM[4] = DC<br>else<br>    MPM[0] = Planar<br>    MPM[1] = DC<br>    MPM[2] = Vertical<br>    MPM[3] = Horizontal<br>    MPM[4] = ? |

Referring to Table 3, if the L mode is greater than 2 (i.e., if (L>2) is true) (refer to Table 1, FIG. 12 or 13), the L mode may be input to an MPM[0], an L−1 mode (e.g., if the L mode is No. 20 mode, No. 19 mode) may be input to an MPM[1], an L+1 mode (e.g., if the L mode is No. 20 mode, No. 21 mode) may be input to an MPM[2], the Planar mode may be input to an MPM[3], and the DC mode may be input to an MPM[4].

In contrast, if the L mode is equal to or smaller than 2 (i.e., if (L>2) is false) (refer to Table 1, FIG. 12 or 13), the Planar mode may be input to the MPM[0], the DC mode may be input to the MPM[1], the vertical mode (e.g., No. 26 mode in the case of FIG. 6 or 12, No. 28 mode in the case of FIG. 13) may be input to the MPM[2], the horizontal mode (e.g., No. 10 mode in the case of FIG. 6 or 12, No. 12 mode in the case of FIG. 13) may be input to the MPM[3], and a specific mode (? mode) may be input to the MPM[4].

In this case, the specific mode (? mode) may correspond to a specific mode other than the Planar mode, the DC mode, the vertical mode and the horizontal mode.

If, as a result of the determination at step S2301, all of the L mode, the A mode and the AL mode are not the same, the encoder/decoder determines whether the L mode and the A mode are the same (i.e., L mode==A mode) or whether the L mode and the AL mode are the same (i.e., L mode==AL mode) or whether the A mode and the AL mode are the same (i.e., A mode==AL mode) (S2303).

That is, the encoder/decoder determines whether any two of the L mode, the A mode and the AL mode are the same although all the L mode, the A mode and the AL mode are not the same.

If, as a result of the determination at step S2303, the L mode and the A mode are the same, the L mode and the AL mode are the same or the A mode and the AL mode are the same, the encoder/decoder configures MPM candidates according to the following method 2 (S2304).

Table 4 illustrates a method (Method 2) of configuring MPM candidates if any two of the L mode and the A mode and the AL mode are the same.

In this case, it has been assumed that the number of MPM candidates is 5. Accordingly, if the number of MPM candidates is determined to be 5, the following MPM candidate determination process may be terminated.

TABLE 4

| Method 2 (L == A or L == AL or A == AL) |
|---|
| In case L == A<br>    Temp1 = L<br>    Temp2 = AL<br>In case L == AL<br>    Temp1 = L<br>    Temp2 = A<br>In case A == AL<br>    Temp1 = A<br>    Temp2 = L<br>MPM[0] = Temp1<br>MPM[1] = Temp2<br>NumMode = 2<br>if (Temp1 != Planar && Temp2 != Planar)<br>    MPM[NumMode++] = Planar<br>if (Temp1 != DC && Temp2 != DC)<br>    MPM[NumMode++] = DC<br>if (Temp1 != Vertical && Temp2 != Vertical)<br>    MPM[NumMode++] = Vertical<br>if (Temp1 != Horizontal && Temp2 != Horizontal)<br>    MPM[NumMode++]= Horizontal<br>if (Temp1 != ? && Temp2 != ?)<br>    MPM[NumMode++] = ? |

Referring to Table 4, first, intra-prediction modes input to the temporary 1 Temp 1 and the temporary 2 Temp2 are determined depending on whether any two of the L mode, the A mode and the AL mode are the same.

If the L mode and the A mode are the same, the L mode is input to the temporary 1 Temp 1 and the AL mode is input to the temporary 2 Temp 2.

If the L mode and the AL mode are the same, the L mode is input to the temporary 1 Temp 1 and the A mode is input to the temporary 2 Temp 2.

If the A mode and the AL mode are the same, the A mode is input to the temporary 1 Temp 1 and the L mode is input to the temporary 2 Temp 2.

The temporary 1 Temp 1 and the temporary 2 Temp 2 determined as described above are input to the MPM[0] and the MPM[1], respectively. Furthermore, 2 may be input to NumMode.

In Table 4, NumMode++ means that a value obtained by adding 1 to NumMode is input to NumMode. That is, MPM[NumMode++]=xx means that an NumMode value is increased by 1 after an xx intra-prediction mode has been set in MPM[NumMode].

(1) If the temporary 1 Temp 1 is not the Planar mode and the temporary 2 Temp 2 is not the Planar mode (i.e., if (Temp1!=Planar && Temp2!=Planar) is true), the Planar mode may be input to the MPM[2] (NumMode=2). Furthermore, the NumMode value may be increased by 1.

(2) If the temporary 1 Temp 1 is not the DC mode and the temporary 2 Temp 2 is not the DC mode (i.e., if (Temp1!=DC && Temp2!=DC) is true), the DC mode may be input to the MPM[2] (if (1) is false, NumMode=2) or the DC mode may be input to the MPM[3] (if (1) is true, NumMode=3). Furthermore, the NumMode value may be increased by 1.

(3) If the temporary 1 Temp 1 is not the vertical mode and the temporary 2 Temp 2 is not the vertical mode (i.e., if (Temp1!=Vertical && Temp2!=Vertical) is true), the vertical mode may be input to the MPM[2] (if both (1) and (2) are false, NumMode=2) or the vertical mode may be input to the MPM[3] (if any one of (1) and (2) is true, NumMode=3) or the vertical mode may be input to the MPM[4] (if both (1) and (2) are true, NumMode 4). Furthermore, the NumMode value may be increased by 1.

(4) If the temporary 1 Temp 1 is not the horizontal mode and the temporary 2 Temp 2 is not the horizontal mode (i.e., if (Temp1!=Horizontal && Temp2!=Horizontal) is true), the horizontal mode may be input to the MPM[3] (if only one of (1) to (3) is true, NumMode=3) or the horizontal mode may be input to the MPM[4] (if only two of (1) to (3) are true, NumMode=4). Furthermore, the NumMode value may be increased by 1.

(5) If the temporary 1 Temp 1 is not a specific mode (? mode) and the temporary 2 Temp 2 is not a specific mode (? mode) (i.e., if (Temp1!=? && Temp2!=?) are true), the specific mode (? mode) may be input to the MPM[4] (if any two of (1) to (4) are true, NumMode=4). Furthermore, the NumMode value may be increased by 1.

If, as a result of the determination at step S2303, any two of the L mode, the A mode and the AL mode are not the same, the encoder/decoder determines whether all of the L mode, the A mode and the AL mode are different (i.e., L mode !=A mode !=AL mode) (S2305). Furthermore, if all of the L mode, the A mode and the AL mode are different, the encoder/decoder configures MPM candidates according to the following method 3 (S2306).

In this case, step S2305 has been illustrated for convenience of description. However, if, as a result of the determination at step S2303, any two of the L mode, the A mode and the AL mode are not the same, step S2305 may be omitted because all the L mode, the A mode and the AL mode are different.

Table 5 illustrates a method (Method 3) of configuring MPM candidates if all of the L mode, the A mode and the AL mode are different.

In this case, it has been assumed that the number of MPM candidates is 5. Accordingly, if the number of MPM candidates is determined to be 5, the following MPM candidate determination process may be terminated.

TABLE 5

Method 3 (L != A != AL)

MPM[0] = L
MPM[1] = A
MPM[2] = AL
NumMode = 3
if (L mode != Planar && A mode != Planar)
  MPM[NumMode++] = Planar
if (L mode != DC && A mode != DC)

TABLE 5-continued

Method 3 (L != A != AL)

MPM[NumMode++] = DC
if (L mode != Vertical && A mode != Vertical)
  MPM[NumMode++] = Vertical
if (L mode != Horizontal && A mode != Horizontal)
  MPM[NumMode++]= Horizontal
if (L mode != ? && A mode != ?)
  MPM[NumMode++] = ?

Referring to Table 5, first, the L mode may be input to the MPM[0], the A mode may be input to the MPM[1], and the AL mode may be input to the MPM[2]. Furthermore, 3 may be input to NumMode.

In Table 5, NumMode++ means that a value obtained by adding 1 to NumMode is input to NumMode. That is, MPM[NumMode++]=xx means an NumMode value is increased by 1 after an xx intra-prediction mode has been set in MPM[NumMode].

(1) If the L mode is not the Planar mode and the A mode is not the Planar mode (i.e., if (L mode !=Planar && A mode !=Planar) is true), the Planar mode may be input to the MPM[3] (NumMode=3). Furthermore, the NumMode value may be increased by 1.

(2) If the L mode is not the DC mode and the A mode is not the DC mode (i.e., if (L mode !=DC && A mode !=DC) is true), the DC mode may be input to the MPM[3] (if (1) is false, NumMode=3) or the DC mode may be input to the MPM[4] (if (1) is true, NumMode=4). Furthermore, the NumMode value may be increased by 1.

(3) If the L mode is not the vertical mode and the A mode is not the vertical mode (i.e., if (L mode !=Vertical && A mode !=Vertical) is true), the vertical mode may be input to the MPM[3] (if both (1) and (2) are false, NumMode=3) or the vertical mode may be input to the MPM[4] (if any one of (1) and (2) is true, NumMode=4). Furthermore, the NumMode value may be increased by 1.

(4) If the L mode is not the horizontal mode and the A mode is not the horizontal mode (i.e., if (L mode !=Horizontal && A mode !=Horizontal) is true), the horizontal mode may be input to the MPM[4] (if only one of (1) to (3) is true, NumMode=4) or the horizontal mode may be input to the MPM[5] (if only two of (1) to (3) are true, NumMode=5). Furthermore, the NumMode value may be increased by 1.

(5) If the L mode is not a specific mode (? mode) and the A mode is not a specific mode (? mode) (i.e., if (L mode !=? && A mode !=?) is true), the specific mode (? mode) may be input to the MPM[5] (if any two of (1) to (4) are true, NumMode=5). Furthermore, the NumMode value may be increased by 1.

As described above, several neighboring blocks around a current block may be selected in order to determine MPM candidates, and the MPM candidates may be determined using the above method.

In the embodiment of FIG. 23, a case where the three neighboring blocks of the left neighboring block L, the above neighboring block A and the above left neighboring block AL has been described. However, the case may be generalized, and MPM candidates may be determined using N neighboring blocks around a current block. This is described in more detail with reference to the following drawing.

Figure 24:
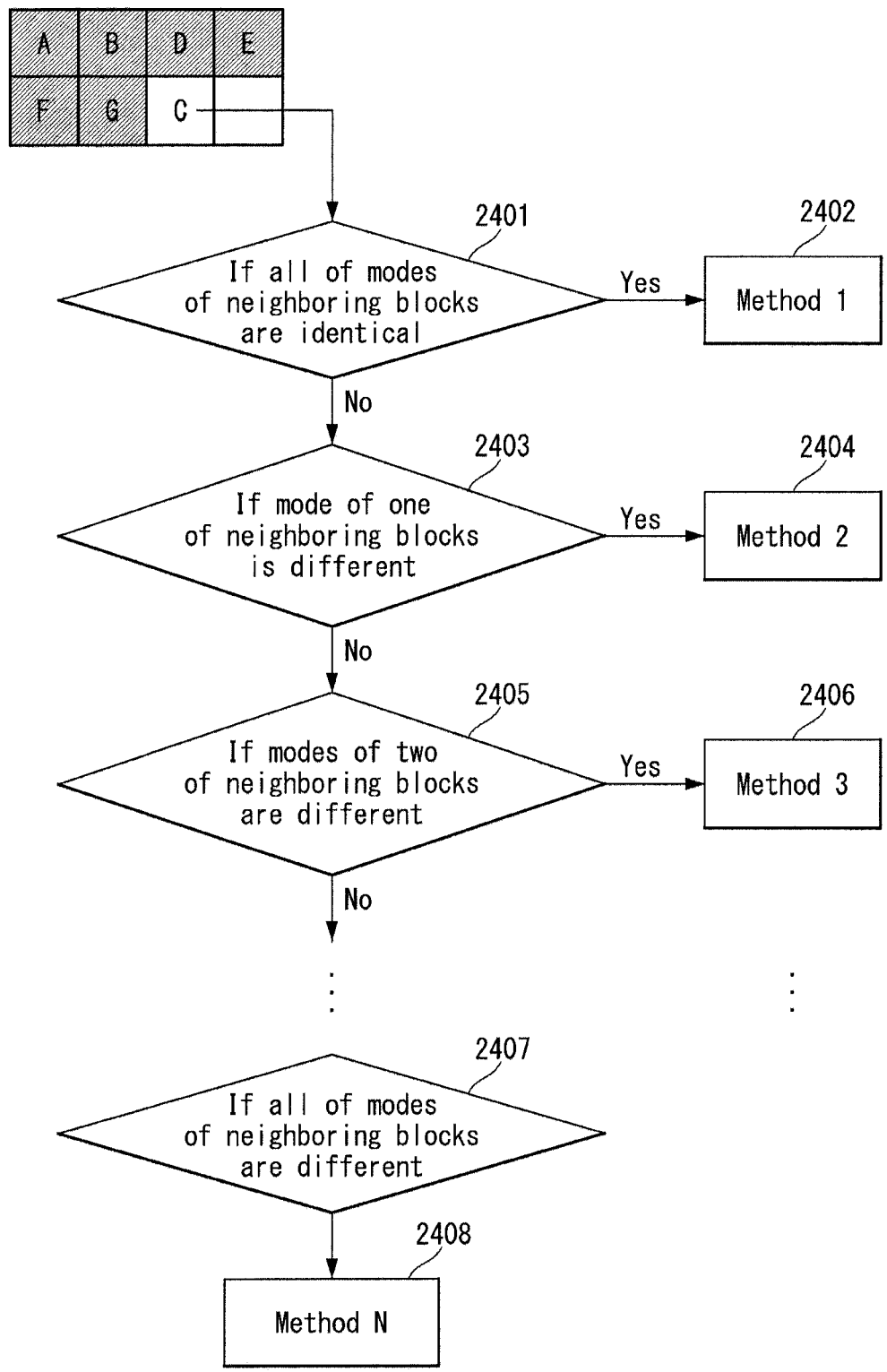
FIG. 24 illustrates a method of configuring MPM candidates according to an embodiment of the present invention.

FIG. 24 illustrates a method of configuring MPM candidates according to an embodiment of the present invention.

In FIG. 24, 'C' indicates a current block, 'D' indicates the top neighboring block of the current block, 'G' indicates the left neighboring block of the current block, 'B' indicates the top left neighboring block of the current block, and 'E' indicates the top right neighboring block of the current block. Furthermore, 'A' indicates the left neighboring block of the top left neighboring block of the current block, and 'F' indicates the left neighboring block of the left neighboring block of the current block.

FIG. 24 illustrates a method of generating MPM candidates using the six neighboring blocks A, B, D, E, F and G around the current block, for convenience of description. However, the present invention is not limited thereto. As described above, in order to generate MPM candidates, N specific neighboring blocks may be used.

That is, in the present invention, neighboring blocks available for generating (configuring) MPM candidates may be understood as a concept, including not only neighboring blocks (i.e., B, D, E and G in FIG. 24) coming into direct contact with a current block, but neighboring blocks (i.e., A and F in FIG. 24) coming into direct contact with neighboring blocks that come into direct contact with the current block. Furthermore, the present invention is not limited thereto and may include a neighboring block coming into direct contact with a neighboring block coming into direct contact with a neighboring block that come into direct contact with a current block.

A neighboring block candidate group may be configured using a plurality of neighboring blocks available for configuring (or generating) the MPM candidates of a current block as described above. In this case, the encoder/decoder may select a neighboring block used to configure the MPM candidates of the current block other than a block from which an intra-prediction mode cannot be derived within the neighboring block candidate group and so that the same intra-prediction mode does not overlap.

As described above, if the MPM candidates of a current block are configured using the intra-prediction mode of the neighboring block candidate group consisting of N blocks neighboring the current block, the encoder/decoder may first check (i.e., derive) an intra-prediction mode applied to each of the blocks within the neighboring block candidate group, may classify the checked intra-prediction modes, and may configure MPM candidates for the current block.

The encoder/decoder determines whether all of the intra-prediction modes of blocks belonging to a neighboring block candidate group are the same (S2401).

If, as a result of the determination at step S2401, all of the intra-prediction modes of the blocks belonging to the neighboring block candidate group are the same, the encoder/decoder may generate MPM candidates according to Method 1 as follows (S2402).

In accordance with Method 1, the encoder/decoder may generate the MPM candidates using N candidate modes (i.e., substitute modes) previously generated based on priority. That is, the intra-prediction modes of the substitute modes may be sequentially input to the MPM candidates based on the priority.

In this case, the intra-prediction modes of the blocks belonging to the neighboring block candidate group may be first input to the MPM candidates, and MPM candidates may be generated using the N candidate modes (i.e., substitute modes) previously generated based on the priority.

In contrast, if, as a result of the determination at step S2401, all of the intra-prediction modes of the blocks belonging to the neighboring block candidate group are not the same, the encoder/decoder determines whether only the intra-prediction mode of one neighboring block of the intra-prediction modes of the blocks belonging to the neighboring block candidate group is different (S2403).

If, as a result of the determination at step S2403, only the intra-prediction mode of one neighboring block of the intra-prediction modes of the blocks belonging to the neighboring block candidate group is different, the encoder/decoder may generate MPM candidates according to Method 2 as follow (S2404).

In accordance with Method 2, the encoder/decoder may apply a method of generating MPMs using two neighboring blocks. That is, the encoder/decoder may input the intra-prediction modes of two neighboring blocks to MPM candidates according to a predetermined sequence, and may then sequentially input the intra-prediction modes of substitute modes to the MPM candidates based on priority.

In contrast, if, as a result of the determination at step S2403, only the intra-prediction mode of one neighboring block of the intra-prediction modes of the blocks belonging to the neighboring block candidate group is not different, the encoder/decoder determines whether only the intra-prediction modes of two neighboring blocks of the intra-prediction modes of the blocks belonging to the neighboring block candidate group are different (S2405).

If, as a result of the determination at step S2405, only the intra-prediction modes of two neighboring blocks of the intra-prediction modes of the blocks belonging to the neighboring block candidate group are different, the encoder/decoder may generate MPM candidates according to Method 3 as follows (S2406).

In accordance with Method 3, the encoder/decoder may apply a method of generating MPMs using three neighboring blocks. That is, the encoder/decoder may input the intra-prediction modes of three neighboring blocks to the MPM candidates according to a predetermined sequence, and may then sequentially input the intra-prediction modes of substitute modes to the MPM candidates based on priority.

Although not shown in FIG. 24, a process of comparing the intra-prediction modes of the blocks belonging to the neighboring block candidate group may be similarly performed up to the step of determining whether all of the intra-prediction modes of the blocks belonging to the neighboring block candidate group are different.

That is, if only the intra-prediction modes of three neighboring blocks of the intra-prediction modes of the blocks belonging to the neighboring block candidate group are different, the encoder/decoder may input the intra-prediction mode of four neighboring blocks to the MPM candidates according to a predetermined sequence, and may then sequentially input the intra-prediction modes of substitute modes to the MPM candidates based on priority.

Furthermore, if only the intra-prediction modes of four neighboring blocks of the intra-prediction modes of the blocks belonging to the neighboring block candidate group are different, the encoder/decoder may input the intra-prediction mode of the five neighboring blocks to MPM candidates according to a predetermined sequence, and may then sequentially input the intra-prediction modes of substitute modes to the MPM candidates based on priority.

Furthermore, if the intra-prediction modes of five neighboring blocks of the intra-prediction modes of the blocks belonging to the neighboring block candidate group are different, the encoder/decoder may input the intra-prediction modes of six neighboring blocks to MPM candidates according to a predetermined sequence, and may then sequentially input the intra-prediction modes of substitute modes to the MPM candidates based on priority.

The encoder/decoder determines whether all of the intra-prediction modes of the blocks belonging to the neighboring block candidate group are different (S2407).

The encoder/decoder may input the intra-prediction modes of six neighboring blocks to the MPM candidates according to a predetermined sequence, and may then sequentially input the intra-prediction modes of substitute modes to the MPM candidates based on priority.

In this case, step S2407 has been illustrated, for convenience of description. As described above, however, if the intra-prediction modes of the five neighboring blocks of the intra-prediction modes of the blocks belonging to the neighboring block candidate group are different, step S2407 may be omitted because all of the intra-prediction modes of the blocks belonging to the neighboring block candidate group are different.

As described above, blocks used to configure MPM candidates may be selected by comparing the intra-prediction modes of the blocks belonging to a neighboring block candidate group. In this case, if the number of selected neighboring blocks (i.e., the number of intra-prediction modes of corresponding neighboring blocks) is greater than a total number of MPM candidates, neighboring blocks used to configure the MPM candidates may be selected again within the selected neighboring blocks by the number of MPM candidates.

That is, blocks to which intra-prediction modes not identical within the neighboring block candidate group have been applied may be selected, and a block may be selected again within the selected blocks by the number of MPM candidates. In this case, a neighboring block may be selected by taking into consideration the distance from a current block.

For example, if all of the intra-prediction modes of the blocks belonging to the neighboring block candidate group are different, all of the intra-prediction modes of the A, B, D, E, F and G blocks are available. In this case, if the number of MPM candidates is 5, the A, B, D, E and G blocks may be selected, and MPM candidates may be generated using the intra-prediction modes of the selected blocks.

Embodiment 4

The encoder determines MPM candidates using the methods of Embodiment 1 to Embodiment 3 and encodes the intra-prediction mode of a current block using the determined MPM candidates.

Hereinafter, a case where five MPM candidates, for convenience of description, are generated and the prediction mode (i.e., MPM index) of a current block is encoded using the five MPM candidates is described below.

For example, if the five MPM candidates are used, the MPM candidates have five intra-prediction modes. Accordingly, in order to efficiently represent the five intra-prediction modes, MPM indices may be encoded using truncated unary (TU) binarization, that is, cMax=4 that is a maximum value of input as in Table 6.

Table 6 illustrates an MPM index encoding method according to an embodiment of the present invention.

TABLE 6

| MPM index (MPM_index) | cMax = 4, TU binarization |
| --- | --- |
| 0 | 0 |
| 1 | 10 |

TABLE 6-continued

| MPM index (MPM_index) | cMax = 4, TU binarization |
| --- | --- |
| 2 | 110 |
| 3 | 1110 |
| 4 | 1111 |

Referring to Table 6, if the MPM index is an N value, bits are encoded into N '1' values and '0'. If the MPM index is cMax, bits are encoded into '1'. In this case, cMax may be previously signaled to the decoder.

Table 7 illustrates an MPM index encoding method according to an embodiment of the present invention.

TABLE 7

| MPM index (MPM_index) | cMax = 4, TU binarization |
| --- | --- |
| 0 | 0 |
| 1 | 100 |
| 2 | 101 |
| 3 | 110 |
| 4 | 111 |

A case where the five MPM candidates, for convenience of description, are generated and the prediction mode (i.e., MPM index) of a current block is encoded using the five MPM candidates is described, but the present invention is not limited thereto. The above method may be identically applied based on the number of MPM candidates. Furthermore, TU binarization, that is, cMax=4, is illustrated. In addition to the cMax=4, the MPM index may be encoded using various binarization methods, such as fixed length coding (FLC) exponential-Golomb binarization.

Figure 25:
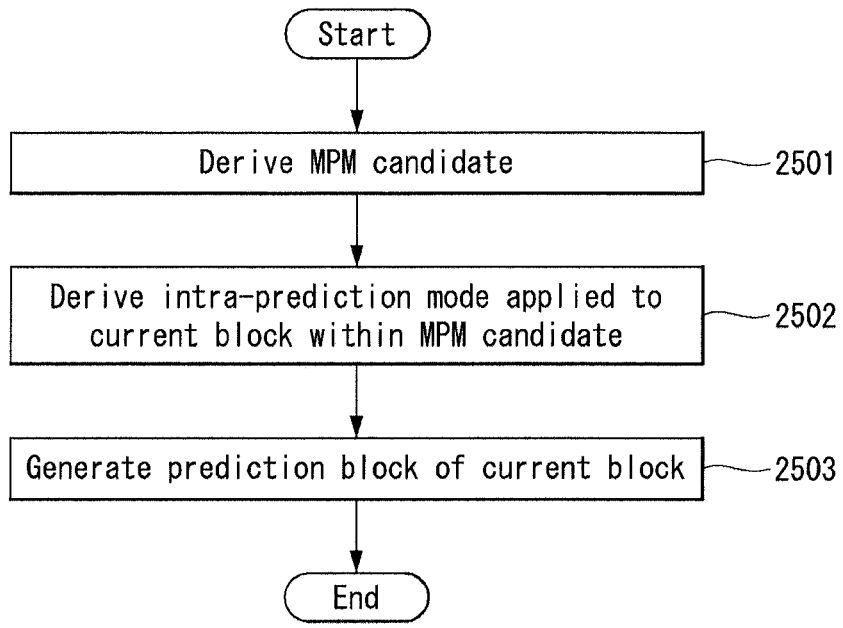
FIG. 25 is a diagram illustrating an intra-prediction mode-based image processing method according to an embodiment of the present invention.

FIG. 25 is a diagram illustrating an intra-prediction mode-based image processing method according to an embodiment of the present invention.

In FIG. 25, it is assumed that an intra-prediction mode for a current block belongs to an MPM candidate.

Referring to FIG. 25, the encoder/decoder derives (or generates or configures) the MPM candidates of the current block (S2501).

In this case, the MPM candidates may be derived by inputting the intra-prediction modes of a plurality of neighboring blocks neighboring the current block, which is applied to the current block within the MPM candidates, to the most probable mode (MPM) candidates and then intra-prediction modes within substitute modes including a plurality of intra-prediction modes to which priority has been assigned to the MPM candidates based on the priority until a total number of the MPM candidates are satisfied.

In this case, the intra-prediction modes of the neighboring blocks may be input to the MPM candidates according to a predetermined sequence and may not be redundantly input to the MPM candidates.

Furthermore, if an intra-prediction mode of a neighboring block is a directional mode, after the intra-prediction mode of the neighboring block is input to an MPM candidate, an intra-prediction mode neighboring the intra-prediction block of the neighboring block may be input to an MPM candidate. For example, if the intra-prediction mode of the neighboring block is a mode 20, after the mode 20 is first input to the MPM candidate, a mode 19 and a mode 21 may be input to the MPM candidate. Furthermore, after an intra-prediction mode neighboring the intra-prediction mode of the intra-prediction block of the neighboring block is input to the MPM candidate, the intra-prediction block neighboring the neighboring intra-prediction mode may be input to the MPM candidate. In the above example, after the mode 19 and mode 21 are input to the MPM candidate, a mode 18 and mode 22 may be input to the MPM candidate.

Furthermore, the same intra-prediction mode as the intra-prediction mode of a neighboring block from among the intra-prediction modes of substitute modes may not be redundantly input to the MPM candidate.

Furthermore, a neighboring block used to derive the MPM candidates of the current block may be selected from a neighboring block candidate group including a plurality of blocks neighboring the current block. In this case, neighboring blocks used to derive the MPM candidates of the current block may be selected by taking into consideration whether the intra-prediction modes of blocks belonging to the neighboring block candidate group can be derived and whether a block that belongs to the blocks belonging to the neighboring block candidate group and to which the same intra-prediction mode is applied is present.

In this case, the neighboring block candidate group may include blocks neighboring the current block as in FIG. 18, 19 or 22, but the neighboring block candidate group may include blocks neighboring the current block and blocks neighboring the blocks neighboring the current block as in FIG. 24.

This is described in more detail. The encoder/decoder may derive MPM candidates by applying the methods of Embodiment 1 to Embodiment 3.

The encoder/decoder derives intra-prediction modes applied to the current block within the MPM candidates (S2502).

The encoder may derive intra-prediction modes applied to the current block within the MPM candidates, may encode an MPM index indicative of the corresponding intra-prediction mode, and may signal it to the decoder. In this case, the encoder may encode the MPM index using the method of Embodiment 4.

The decoder may derive an intra-prediction mode applied to the current block using the MPM index received from the encoder.

The encoder/decoder generates the prediction block of the current block (S2503).

That is, the encoder/decoder generates the prediction block of the current block by applying the derived intra-prediction mode.

In this case, as in the example of FIG. 5, the encoder/decoder may check whether the neighboring samples of a current processing block can be used for prediction, and may configure reference samples to be used for prediction. In this case, as in the example of FIG. 14, if the intra-prediction mode of the current block is the Planar mode, the encoder/decoder may select the reference samples used for prediction depending on the type of Planar mode. Furthermore, the encoder/decoder may perform the filtering of the reference samples based on intra-prediction modes. Furthermore, the encoder/decoder may generate a prediction block for the current processing block based on the intra-prediction modes and the reference samples.

Figure 26:
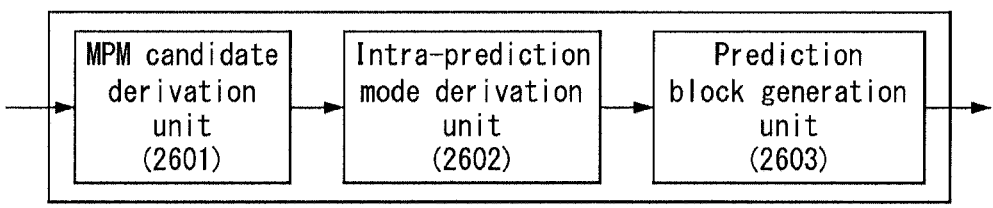
FIG. 26 is a diagram illustrating an intra-prediction unit according to an embodiment of the present invention.

FIG. 26 is a diagram illustrating an intra-prediction unit according to an embodiment of the present invention.

FIG. 26 shows an intra-prediction unit 182 (refer to FIG. 1); 262 (refer to FIG. 2) in a single block form, for convenience of description, but the intra-prediction unit 182, 262 may be implemented as an element included in the encoder and/or the decoder.

Referring to FIG. 26, the intra-prediction unit 182, 262 implements the functions, processes and/or methods proposed in FIGS. 18 to 25. Specifically, the intra-prediction unit 182, 262 may be configured to include an MPM candidate derivation unit 2601, an intra-prediction mode derivation unit 2602 and a prediction block generation unit 2603.

The MPM candidate derivation unit 2601 derives (or generates or configures) the MPM candidates of a current block. In this case, the MPM candidate derivation unit 2601 may derive MPM candidates by inputting the intra-prediction modes of a plurality of neighboring blocks neighboring the current block to most probable mode (MPM) candidates and then inputting intra-prediction modes within substitute modes including the plurality of intra-prediction modes to which priorities has been assigned to the MPM candidates based on the priority until a total number of the MPM candidates are satisfied.

In this case, the intra-prediction modes of the neighboring blocks may be input to the MPM candidates according to a predetermined sequence and may not be redundantly input to the MPM candidates.

Furthermore, if an intra-prediction mode of a neighboring block is a directional mode, after the intra-prediction mode of the neighboring block is input to an MPM candidate, an intra-prediction mode neighboring the intra-prediction block of the neighboring block may be input to an MPM candidate. For example, if the intra-prediction mode of the neighboring block is a mode 20, after the mode 20 is first input to the MPM candidate, a mode 19 and a mode 21 may be input to the MPM candidate. Furthermore, after an intra-prediction mode neighboring the intra-prediction mode of the intra-prediction block of the neighboring block is input to the MPM candidate, the intra-prediction block neighboring the neighboring intra-prediction mode may be input to the MPM candidate. In the above example, after the mode 19 and mode 21 are input to the MPM candidate, a mode 18 and mode 22 may be input to the MPM candidate.

Furthermore, the same intra-prediction mode as the intra-prediction mode of a neighboring block from among the intra-prediction modes of substitute modes may not be redundantly input to the MPM candidate.

Furthermore, a neighboring block used to derive the MPM candidates of the current block may be selected from a neighboring block candidate group including a plurality of blocks neighboring the current block. In this case, neighboring blocks used to derive the MPM candidates of the current block may be selected by taking into consideration whether the intra-prediction modes of blocks belonging to the neighboring block candidate group can be derived and whether a block that belongs to the blocks belonging to the neighboring block candidate group and to which the same intra-prediction mode is applied is present.

In this case, the neighboring block candidate group may include blocks neighboring the current block as in FIG. 18, 19 or 22, but the neighboring block candidate group may include blocks neighboring the current block and blocks neighboring the blocks neighboring the current block as in FIG. 24.

More specifically, the MPM candidate derivation unit 2601 may derive MPM candidates by applying the methods of Embodiment 1 to Embodiment 3.

The intra-prediction mode derivation unit 2602 may derive intra-prediction modes applied to a current block within MPM candidates.

If the intra-prediction mode derivation unit 2602 is included in the decoder, the intra-prediction mode derivation unit 2602 may derive intra-prediction modes applied to a current block using MPM indices received from the encoder.

In this case, the MPM index may be encoded using the method of Embodiment 4 by the encoder.

The prediction block generation unit 2603 generates the prediction block of a current block. That is, the prediction block generation unit 2603 generates the prediction block of the current block using derived intra-prediction modes.

In this case, as in the example of FIG. 5, the encoder/decoder may check whether the neighboring samples of a current processing block can be used for prediction, and may configure reference samples to be used for prediction. In this case, as in the example of FIG. 14, if the intra-prediction mode of the current block is the planar mode, the encoder/decoder may select the reference samples used for prediction depending on the type of planar mode. Furthermore, the encoder/decoder may perform the filtering of the reference samples based on intra-prediction modes. Furthermore, the encoder/decoder may generate a prediction block for the current processing block based on the intra-prediction modes and the reference samples.

Figure 27:
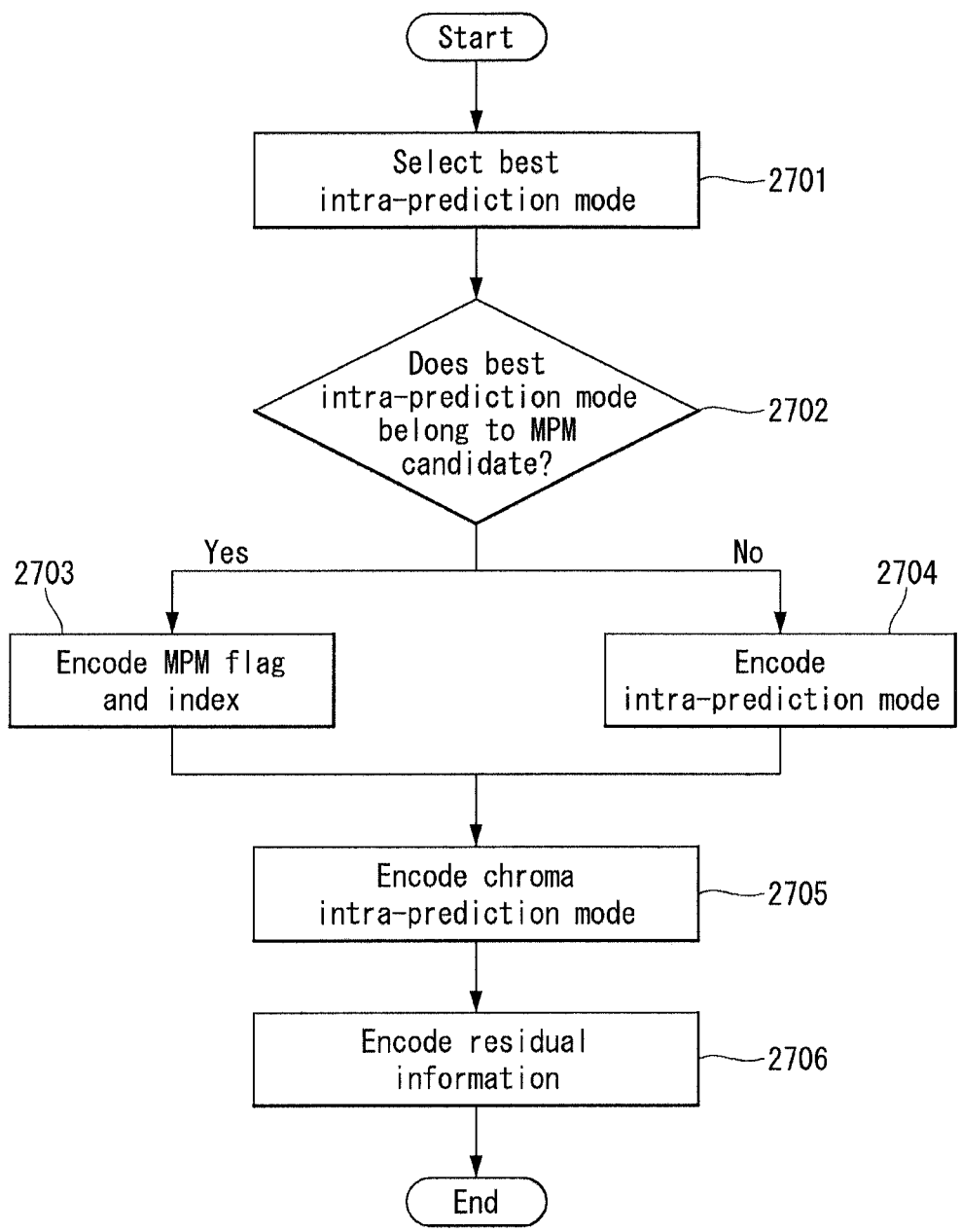
FIG. 27 is a diagram illustrating a video encoding method based on an intra-prediction mode according to an embodiment of the present invention.

FIG. 27 is a diagram illustrating a video encoding method based on an intra-prediction mode according to an embodiment of the present invention.

Referring to FIG. 27, the encoder selects the best intra-prediction mode of a current block (S2701). In this case, the encoder may determine the intra-prediction mode of the current block by calculating a rate-distortion (RD) cost between the current block according to the intra-prediction mode and a prediction block.

The encoder determines whether the selected intra-prediction mode of the current block belongs to an MPM candidate (S2702).

That is, the encoder may derive the MPM candidate of the current block using the methods of Embodiment 1 to Embodiment 3, and may determine whether the intra-prediction mode of the current block belongs to the MPM candidate.

If, as a result of the determination at step S2702, the intra-prediction mode of the current block belongs to the MPM candidate, the encoder encodes an MPM flag and an MPM index (S2703).

In this case, the MPM flag may indicate whether the intra-prediction mode of the current block is derived from a surrounding intra-predicted block (i.e., the intra-prediction mode of the current block belongs to an MPM).

Furthermore, the MPM index may indicate which MPM mode of MPM candidates is applied as the intra-prediction mode of the current block. In this case, the MPM index may be encoded using the method of Embodiment 4.

If, as a result of the determination at step S2702, the intra-prediction mode of the current block does not belong to the MPM candidate, the encoder encodes the intra-prediction mode of the current block (S2704).

The encoder encodes a chroma intra-prediction mode (S2705).

The encoder encodes residual information between the current block and the prediction block (S2706).

That is, the encoder may generate the residual information by subtracting the prediction block, generated using the selected best intra-prediction mode, from the current block.

Thereafter, the encoder signals the residual information, together with encoded side information (e.g., MPM flag, MPM index and intra-prediction mode.), to the decoder.

Figure 28:
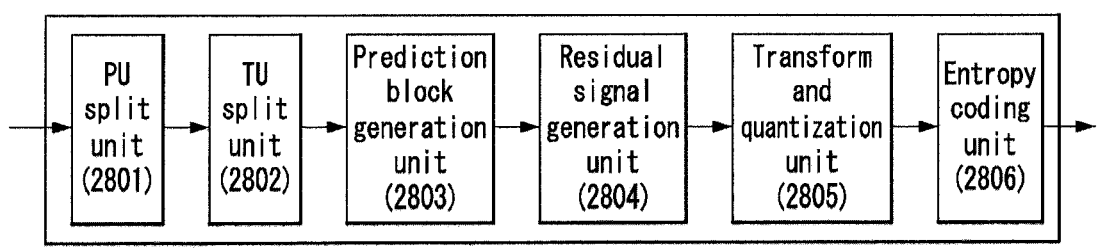
FIG. 28 is a diagram illustrating an intra-encoding unit according to an embodiment of the present invention.

FIG. 28 is a diagram illustrating an intra-encoding unit according to an embodiment of the present invention.

Referring to FIG. 28, the intra-encoding unit may be configured to include a prediction unit (PU) split unit 2801, a transform unit (TU) split unit 2802, a prediction block generation unit 2803, a residual signal generation unit 2804, a transform and quantization unit 2805 and an entropy coding unit 2806.

The PU split unit 2801 splits an input video signal (or picture or frame), input to the intra-encoding unit, into one or more PUs. For example, the PU split unit 2801 may split an input video into Pus using the method, such as the example of FIG. 4.

The TU split unit 2802 splits an input video signal (or picture or frame), input to the intra-encoding unit, into one or more TUs. For example, the TU split unit 2802 may split an input video into TUs using the method, such as the example of FIG. 3.

The prediction block generation unit 2803 generates the prediction block of a current block with reference to samples around a block to be now encoded.

In this case, like the intra-prediction unit of FIG. 26, the prediction block generation unit 2803 may be configured to include the intra-prediction unit of FIG. 26. That is, the prediction block generation unit 2803 may select the best intra-prediction mode of a current block, and may determine whether the selected intra-prediction mode belongs to an MPM candidate of a current block using the methods of Embodiment 1 to Embodiment 3. If the selected intra-prediction mode belongs to the MPM candidate of the current block, the prediction block generation unit 2803 may transfer an MPM flag and MPM index information to the entropy coding unit 2806. If not, the prediction block generation unit 2803 may transfer intra-prediction mode information of the current block to the entropy coding unit 2806. Furthermore, the prediction block generation unit 2803 may generate the prediction block of the current block by applying the selected intra-prediction mode.

The residual signal generation unit 2804 generates a residual signal (or residual block) by subtracting a prediction block, generated by the prediction block generation unit 2803, from a block to be now encoded.

The transform and quantization unit 2805 generates transform coefficients by applying a transform scheme to a residual signal (or residual block), and quantizes the transform coefficients.

The entropy coding unit 2806 entropy-codes a quantized signal and outputs it in a bitstream. Furthermore, the entropy coding unit 2806 may encode information received from the prediction block generation unit 2803, and may output it in a bitstream. In this case, the entropy coding unit 2806 may encode an MPM index using the method of Embodiment 4.

Figure 29:
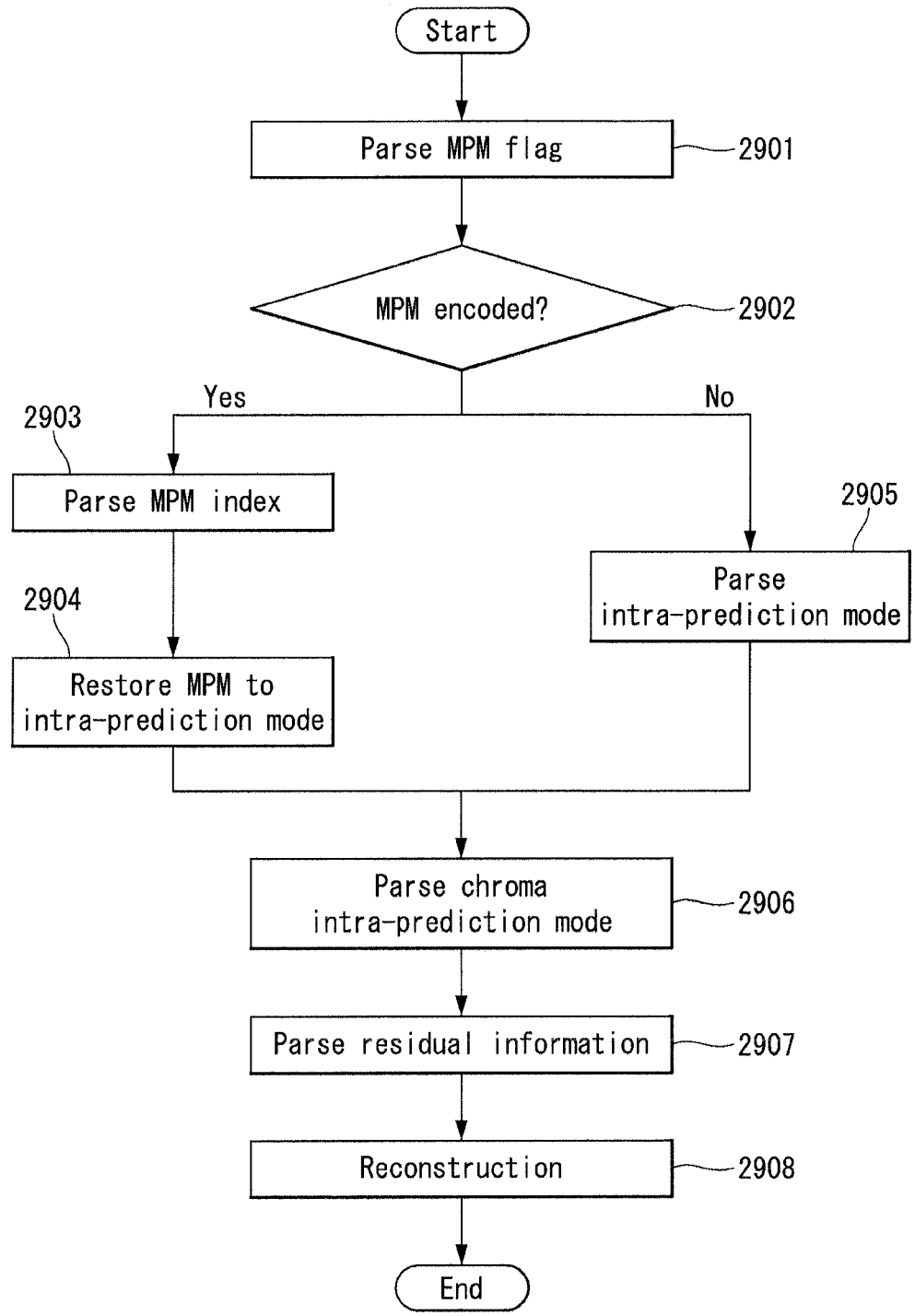
FIG. 29 is a diagram illustrating a video decoding method based on an intra-prediction mode according to an embodiment of the present invention.

FIG. 29 is a diagram illustrating a video decoding method based on an intra-prediction mode according to an embodiment of the present invention.

Referring to FIG. 29, the decoder parses an MPM flag (S2901).

The decoder determines whether MPM encoding is applied to a current block based on the MPM flag value (S2902).

If, as a result of the determination at step S2902, MPM encoding is applied to the current block, the decoder parses the MPM index (S2903).

Furthermore, the decoder may restore an MPM mode indicated by the MPM index into an intra-prediction mode for the current block (S2904).

That is, the decoder derives the MPM candidate of the current block using the methods of Embodiment 1 to Embodiment 3, and uses an intra-prediction mode indicated by the MPM index within the derived MPM candidate as the intra-prediction mode of the current block.

In this case, the MPM index may be encoded using the method of Embodiment 4 by the encoder.

In contrast, if, as a result of the determination at step S2902, MPM encoding is not applied to the current block, the decoder parses an intra-prediction mode for the current block (S2905).

The decoder parses a chroma intra-prediction mode for the current block (S2906).

The decoder parses residual information for the current block (S2907).

The decoder reconstructs the current block (i.e., generates a reconstructed block) by adding the residual information for the current block and the prediction block together (S2908).

That is, the decoder may generate the reconstructed block by adding the prediction block and residual information generated using all of the intra-prediction modes of the current block derived at step S2903/S2904 or step S2905.

Figure 30:
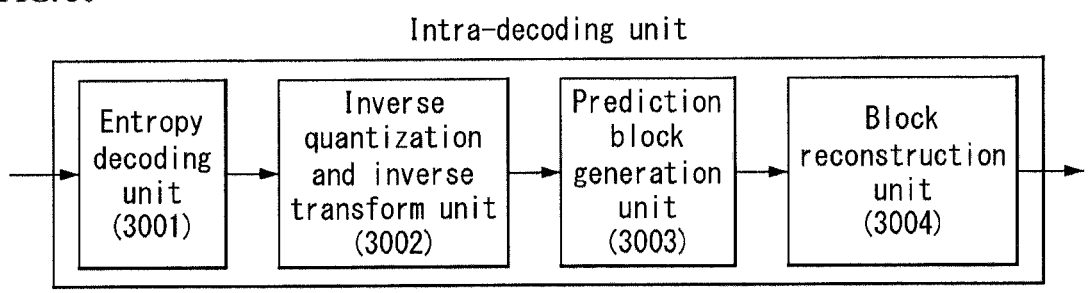
FIG. 30 is a diagram illustrating an intra-decoding unit according to an embodiment of the present invention.

FIG. 30 is a diagram illustrating an intra-decoding unit according to an embodiment of the present invention.

Referring to FIG. 30, the intra-decoding unit may be configured to include an entropy decoding unit 3001, a dequantization and inverse transform unit 3002, a prediction block generation unit 3003 and a block reconstruction unit 3004.

The entropy decoding unit 3001 performs entropy decoding on a signal (i.e., bitstream) received from the encoder.

The dequantization and inverse transform unit 3002 obtains transform coefficients from an entropy-decoded signal using quantization step size information, and obtains a residual signal (or residual block) by inversely transforming the transform coefficients by applying an inverse transform scheme.

The prediction block generation unit 3003 generates the prediction block of a current block with reference to samples around the block to be now decoded.

In this case, the prediction block generation unit 3003 may be configured like the intra-prediction unit of FIG. 26 or to include the intra-prediction unit of FIG. 26. That is, the prediction block generation unit 3003 may derive the intra-prediction mode of a current block using an MPM index within the candidates of the current block derived using the methods of Embodiment 1 to Embodiment 3. Furthermore, the prediction block generation unit 3003 may generate the prediction block of the current block by applying the derived intra-prediction mode.

In this case, the MPM index may be encoded by the encoder using the method of Embodiment 4.

The block reconstruction unit 3004 reconstructs the current block (i.e., generates a reconstructed block for the current block) by adding a residual signal (or residual block), received from the dequantization and inverse transform unit 3002, and a prediction block received from the prediction block generation unit 3003.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of processing a video based on an intra-prediction mode, the method comprising:
deriving a most probable mode (MPM) candidate by inputting intra-prediction modes within a neighboring block candidate group configured using a plurality of neighboring blocks neighboring a current block to the MPM candidate and then inputting an intra-prediction mode within a substitute mode group configured as a plurality of intra-prediction modes to which priority has been assigned to the MPM candidate based on the priority until a total number of the MPM candidates are satisfied,
wherein the neighboring block candidate group includes a top neighboring block of the current block, a left neighboring block of the current block, a top left neighboring block of the current block, a top right neighboring block of the current block, a left neighboring block of the top left neighboring block of the current block and a left neighboring block of the left neighboring block of the current block,
wherein the substitute mode group includes a planar mode, a DC mode, a vertical mode, a horizontal mode, a 45° mode and a 135° mode,
wherein the priority has been assigned to each of prediction modes in the substitute mode group according to a frequency of occurrence to be an MPM candidate of previously decoded blocks, and wherein a prediction mode having a higher frequency of occurrence to be the MPM candidate of previously decoded blocks has a higher priority than other modes of the substitute mode group;

deriving an intra-prediction mode applied to the current block using an MPM index indicative of a specific intra-prediction mode within the MPM candidate; and generating a prediction block of the current block by applying the derived intra-prediction mode, wherein the intra-prediction modes of the neighboring blocks are input to the MPM candidate according to a predetermined sequence and are not redundantly input to the MPM candidate, and wherein an intra-prediction mode identical with the intra-prediction mode of the neighboring block from among the intra-prediction mode within the substitute mode group is not redundantly input to the MPM candidate.

2. The method of claim 1, wherein if the intra-prediction mode of the neighboring block is a directional mode, after the intra-prediction mode of the neighboring block is input to the MPM candidate, an intra-prediction mode neighboring the intra-prediction mode of the neighboring block is input to the MPM candidate.

3. The method of claim 2, wherein after the intra-prediction mode neighboring the intra-prediction mode of the neighboring block is input to the MPM candidate, an intra-prediction block neighboring the neighboring intra-prediction mode is input to the MPM candidate.

4. The method of claim 1, wherein the neighboring block is selected from the neighboring block candidate group configured as the plurality of blocks neighboring the current block.

5. The method of claim 4, wherein the neighboring block candidate group is configured as blocks neighboring the current block.

6. The method of claim 4, wherein the neighboring block candidate group is configured as a block neighboring the current block and blocks neighboring the block neighboring the current block.

7. The method of claim 4, wherein the neighboring block is selected by taking into consideration whether an intra-prediction mode of a block belonging to the neighboring block candidate group is capable of being derived and whether a block to which an identical intra-prediction mode is applied exists among the blocks belonging to the neighboring block candidate group.

8. An apparatus for processing a video based on an intra-prediction mode, the apparatus comprising:

an MPM candidate derivation unit deriving a most probable mode (MPM) candidate by inputting intra-prediction modes within a neighboring block candidate group configured using a plurality of neighboring blocks neighboring a current block to the MPM candidate and then inputting an intra-prediction mode within a substitute mode group configured as a plurality of intra-prediction modes to which priority has been assigned to the MPM candidate based on the priority until a total number of the MPM candidates are satisfied, wherein the neighboring block candidate group includes a top neighboring block of the current block, a left neighboring block of the current block, a top left neighboring block of the current block, a top right neighboring block of the current block, a left neighboring block of the top left neighboring block of the current block and a left neighboring block of the left neighboring block of the current block, wherein the substitute mode group includes a planar mode, a DC mode, a vertical mode, a horizontal mode, a 45° mode and a 135° mode, wherein the priority has been assigned to each of prediction modes in the substitute mode group according to a frequency of occurrence to be an MPM candidate of previously decoded blocks, and wherein a prediction mode having a higher frequency of occurrence to be the MPM candidate of previously decoded blocks has a higher priority than other modes of the substitute mode group;

an intra-prediction mode derivation unit deriving an intra-prediction mode applied to the current block using an MPM index indicative of a specific intra-prediction mode within the MPM candidate; and a prediction block generation unit generating a prediction block of the current block by applying the derived intra-prediction mode, wherein the intra-prediction modes of the neighboring block candidate group are input to the MPM candidate according to a predetermined sequence and are not redundantly input to the MPM candidate, and wherein an intra-prediction mode identical with the intra-prediction mode of the neighboring block from among the intra-prediction mode within the substitute mode group is not redundantly input to the MPM candidate.

* * * * *